United States Patent
Gulati et al.

(10) Patent No.: US 8,014,970 B2
(45) Date of Patent: Sep. 6, 2011

(54) SOFTWARE ENABLED VIDEO AND SENSOR INTEROPERABILITY SYSTEM AND METHOD

(75) Inventors: Sandeep Gulati, La Canada, CA (US);
Vijay Daggumati, Pasadena, CA (US);
Robin Hill, South Pasadena, CA (US);
Dan Mandutianu, Pasadena, CA (US);
Tong Ha, San Gabriel, CA (US)

(73) Assignee: Vialogy Corporation, Altadena, CA (US)

( * ) Notice: Subject to any disclaimer, the term of this patent is extended or adjusted under 35 U.S.C. 154(b) by 53 days.

(21) Appl. No.: 11/784,881

(22) Filed: Apr. 9, 2007

(65) Prior Publication Data

US 2008/0052757 A1    Feb. 28, 2008

Related U.S. Application Data

(60) Provisional application No. 60/790,767, filed on Apr. 8, 2006.

(51) Int. Cl.
*G01D 1/00* (2006.01)
(52) U.S. Cl. ..................................................... 702/127
(58) Field of Classification Search .................... 702/127
See application file for complete search history.

(56) References Cited

U.S. PATENT DOCUMENTS

| | | | |
|---|---|---|---|
| 6,589,831 B2 * | 7/2003 | Yoon | 438/197 |
| 6,859,831 B1 * | 2/2005 | Gelvin et al. | 709/224 |
| 7,020,701 B1 * | 3/2006 | Gelvin et al. | 709/224 |
| 2004/0252053 A1 * | 12/2004 | Harvey | 342/357.15 |
| 2007/0143855 A1 * | 6/2007 | Gilchrist et al. | 726/26 |
| 2007/0192351 A1 * | 8/2007 | Liu et al. | 707/102 |
| 2008/0057481 A1 * | 3/2008 | Schmitt | 434/350 |

OTHER PUBLICATIONS

Jean-Piere Bardet, Kincho Law, Jun Peng and Jennifer Swift, Overview of NEES data and metadata models, Aug. 1-4, 2004, 13th world conference on earthquake engineering.*
Web Services Policy Framework (WS-Policy), http://specs.xmlsoap.org/ws/2004/09/policy/ws-policy.pdf, Mar. 2006 (25 pgs).
Open Geospatial Consortium's SensorML website link referred to on p. 15 of Application, http://www.opengeospatial.org/standards/sensorml, copyright 2008 (2 pgs.).

* cited by examiner

*Primary Examiner* — Aditya Bhat
(74) *Attorney, Agent, or Firm* — DLA Piper LLP (US)

(57) ABSTRACT

A novel method and software system design are presented for interchanging sensors from different vendors in a plug and play manner to drive mission critical applications within a sensor based architecture, policy based framework, event-based architecture. This technique is applicable to sensors directly attached to a computer, or sensors attached to a network, or sensors attached to a controller node which is attached to a network or directly attached to a computer.

16 Claims, 35 Drawing Sheets

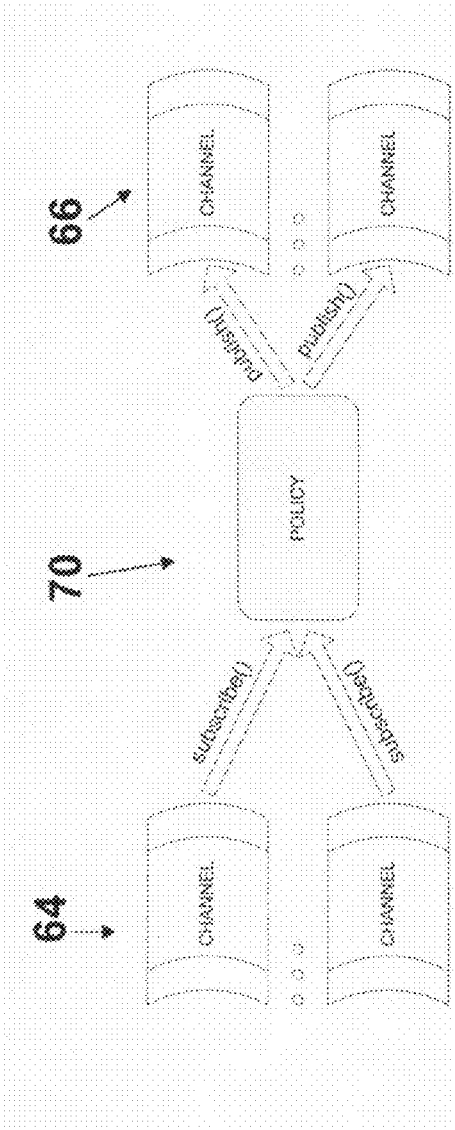
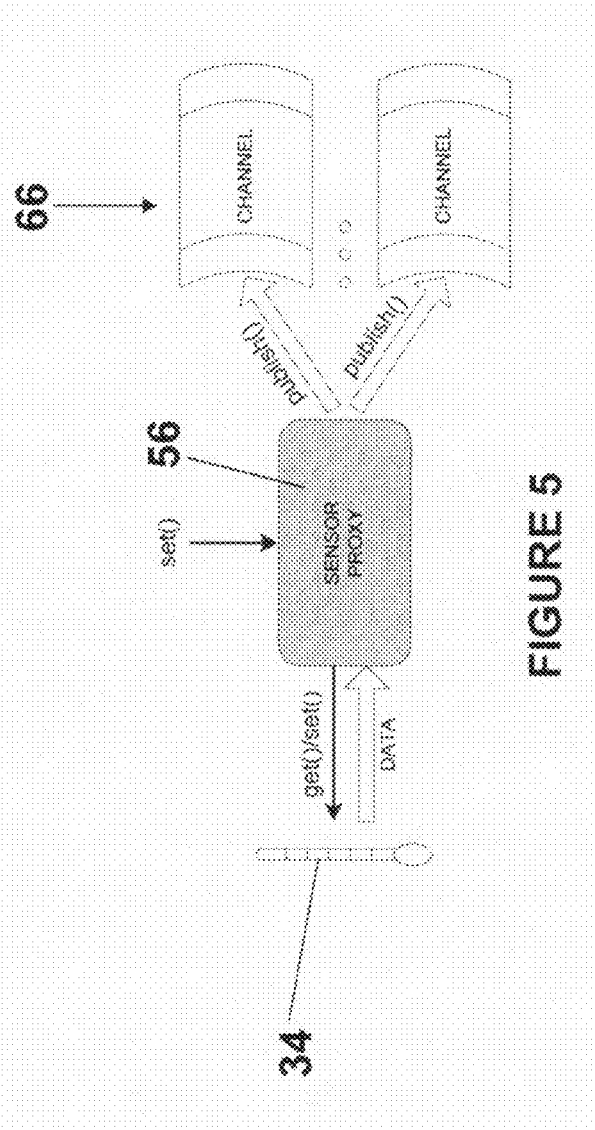
FIGURE 4
FIGURE 5

230a

| GeneAttributeData |
| --- |
| (from metadata) |
| ◇m_passLogicalCondition : bool |
| ◇m_IsA : int |
| ◇m_order : int |
| ◆GeneAttributeData() |
| ◆GeneAttributeData() |
| ◆GeneAttributeData() |
| ◆~GeneAttributeData() |
| ◆operator =() |
| ◆operator ==() |
| ◆getGeneName() |
| ◆isPresent() |
| ◆getPassCondition() |
| ◆getValue() |
| ◆getString() |
| ◆getArray() |
| ◆contains() |
| ◆getSortCriteria() |
| ◆getVariableIds() |
| ◆IsA() |
| ◆format() |
| ◆format() |
| ◆expose() |
| ◆getGroup() |
| ◆getSubAttribute() |
| ◆getSubAttribute() |
| ◆getSubAttributes() |
| ◆getSubAttributeNames() |
| ◆getOrderedSubAttributes() |
| ◆getOrder() |
| ◆setGeneName() |
| ◆setIsPresent() |
| ◆initVariables() |
| ◆removeVariables() |
| ◆setValue() |
| ◆setString() |
| ◆setArray() |
| ◆setIsA() |
| ◆setGroup() |
| ◆addSubAttribute() |
| ◆rmSubAttribute() |
| ◆clearSubAttributes() |
| ◆setOrder() |
| ◆parse() |
| ◆Clone() |
| ◆checkSortCriteria() |
| ◆setSortCriteria() |
| ◆loadAttributeValues() |
| ◆matchFilter() |
| ◆acceptVisitor() |
| ◆ViaCollectableFactory() |
| ◆operator !=() |
| ◆operator <() |
| ◆operator >() |
| ◆operator <=() |
| ◆operator >=() |
| ◇convertOutputValue() |
| ◇throwAccessFailException() |

| GeneAttributeDataRepository |
| --- |
| Instance() |
| Shutdown() |
| find() |
| reset() |
| FindNextSet() |
| getMode() |
| getSelectedNames() |
| getCommand() |
| getCurrentProfile() |
| getProfileList() |
| getProfile() |
| clearResults() |
| eraseResult() |
| addResult() |
| addResult() |
| rename() |
| setMode() |
| updateSelections() |
| addToProfileList() |
| rmProfile() |
| clearCurrentProfile() |
| moveSavedProfileToCurrent() |
| loadProfile() |
| setCommand() |
| setFilter() |
| getFilter() |
| setAcceptFilter() |
| getAcceptFilter() |
| GeneAttributeDataRepository() |
| GeneAttributeDataRepository() |
| ~GeneAttributeDataRepository() |
| operator =() |

FIGURE 21

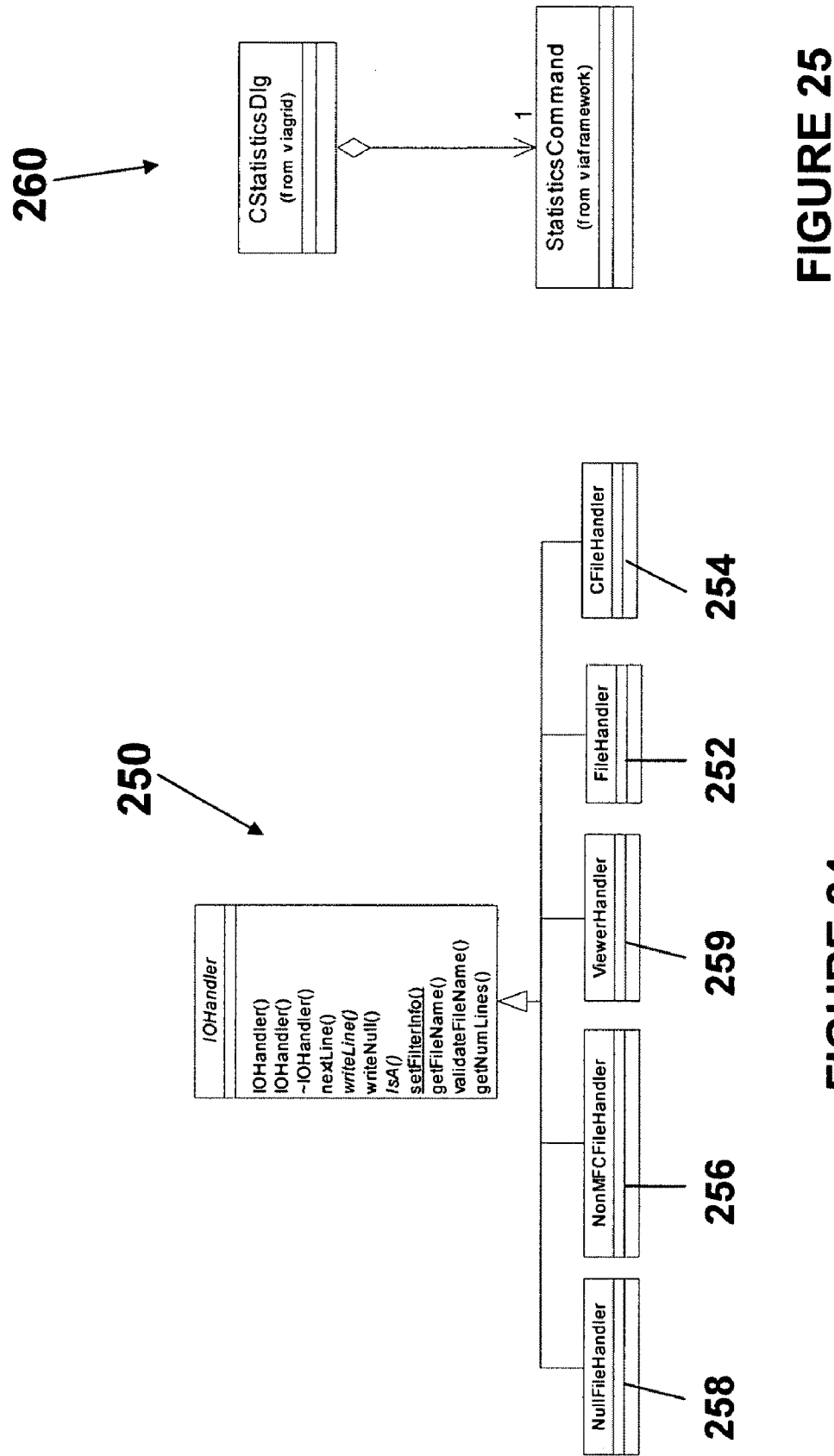

SOFTWARE ENABLED VIDEO AND SENSOR INTEROPERABILITY SYSTEM AND METHOD

PRIORITY CLAIM

This application claims priority under 35 USC 119(e) and 120 to U.S. Provisional Patent Application Ser. No. 60/790,767 filed on Apr. 8, 2006 and entitled "Software Enabled Video and Sensor Interoperability" which is incorporated herein by reference.

APPENDICES

Appendix A (9 pages) contains an example of a policy of the system;

Appendix B (17 pages) contains the grammar for the Sensor Policy Engine;

Appendix C (40 pages) contains information about a sensor policy framework.

All of the appendices form part of the specification.

FIELD OF THE INVENTION

The invention relates generally to a sensor network and in particular to a system and method for providing internet protocol (IP) and software enabled video and sensor interoperability.

BACKGROUND OF THE INVENTION

In March 2006, a new version of a web services policy framework (WS-Policy Framework V1.2) was published (See http://schemas.xmlsoap.org/ws/2004/09/policy/ for more details of this framework) that defined various aspects of a policy framework. The Web Services Policy Framework (WS-Policy) provides a general purpose model and corresponding syntax to describe the policies of a Web Service. WS-Policy defines a base set of constructs that can be used and extended by other Web services specifications to describe a broad range of service requirements and capabilities.

The entire WS-Policy terminology and hierarchy is applicable to sensor-based policies. In fact, a lot of theoretical work exists for a sensor policy framework system including DARPA (DAML, CoABS, CoAX), Nomads (Oasis and Spring) and KAoS. However, no one has developed a productizable and scaleable sensor-based policy system. The theoretical work typically provided a generalized implementation and could not be scaled for productization. It would be desirable to provide an in-network, in-stream, real-time intrusive content analysis as sensor data moves through a system and it is to this end that the present invention is directed.

SUMMARY OF THE INVENTION

A software enabled video and sensor interoperability system and method are provided that is a novel method and software system design for interchanging sensor data and information from different vendors in a plug and play manner to drive mission critical applications within a sensor based architecture, policy based framework, event-based architecture. The sensors used in the system may include any information source or information proxy regardless of the underlying device physics, physical measurement, or the format in which the physical measurement is communicated to a computer. In accordance with the invention, the computational steps are specified for hiding all the hardware details from the user or implementer. The process allows replacement of one sensor from one manufacturer with another sensor making the same measurement using another sensor from another manufacturer, with no loss of performance or functional utility. This policy based framework is denoted as Sensor Policy Manager (SPM). It is a generalized network-centric policy-based platform for delivering sensor, video and geographical information system (GIS) interoperability. This technique is applicable to sensors directly attached to a computer, or sensors attached to a network, or sensors attached to a controller node which is attached to a network or directly attached to a computer. The system and method are extremely scalable and can be applied to sensor deployments ranging from few sensors to millions of sensory nodes. The system can be implemented in a centralized manner, or distributed on a number of computers or embedded within a broader processing architecture.

The system also provides systematic, reusable, scalable introduction of different types of sensors within the client policy framework. The system is therefore capable of addressing the needs to multiple vertical markets such as security systems, supply chain systems, etc., with varying sensor deployments. The system also provides a sensor-based policy primitives and sensor based policy actions for implementing domain specific policies at the user level.

Thus, in accordance with the invention, a sensor interoperability system is provided that has one or more sensors that each generate a piece of sensor data and one or more sensor proxies, each sensor proxy coupled to one of the one or more sensors wherein each sensor proxy processes the piece of sensor data from the sensor to create a sensor system piece of data wherein the system piece of data has a common format. The system also has a policy unit coupled to the one or more sensor proxies over a communications path, wherein the policy unit further comprises one or more policies wherein each policy further comprises a condition and an action wherein the condition tests a sensor system piece of data and the action is an action that occurs when the condition is satisfied and a policy engine that applies the one or more policies to the sensor system piece of data.

In accordance with another aspect of the invention, a method for monitoring a system using a sensor network is provided. In the method, a piece of sensor data at each of one or more sensors is generated and each piece of sensor data of each sensor is processed using a sensor proxy to create a sensor system piece of data wherein the sensor system piece of data has a common format. Then, the system determines if the sensor piece of data triggers a policy contained in a policy engine wherein the policy is triggered when the sensor system piece of data meets a condition of one or more policies stored in the policy engine. The system then performs the action of the triggered policy.

BRIEF DESCRIPTION OF THE DRAWINGS

FIG. 4 illustrates more details of a policy of the system shown in FIGS. 1 and 2;

FIG. 5 illustrates more details of a sensor proxy of the system shown in FIGS. 1 and 2;

FIG. 21 illustrates more details of the AttributeDataRepository class;

FIG. 22 illustrates more details of the AttributeData class;

FIG. 24 illustrates an I/O handler object model of the policy engine;

FIG. 25 illustrates a dialog box/command object class of the policy engine;

DETAILED DESCRIPTION OF EXEMPLARY EMBODIMENTS

The invention is particularly applicable to a web-based, software enabled sensor and video interoperability system and method using the sensors described below and it is in this context that the invention will be described. It will be appreciated, however, that the system and method in accordance with the invention has greater utility since the system may be used with a variety of sensors not specifically disclosed below and may be implemented using other architectures that those specifically described below.

Figure 1:
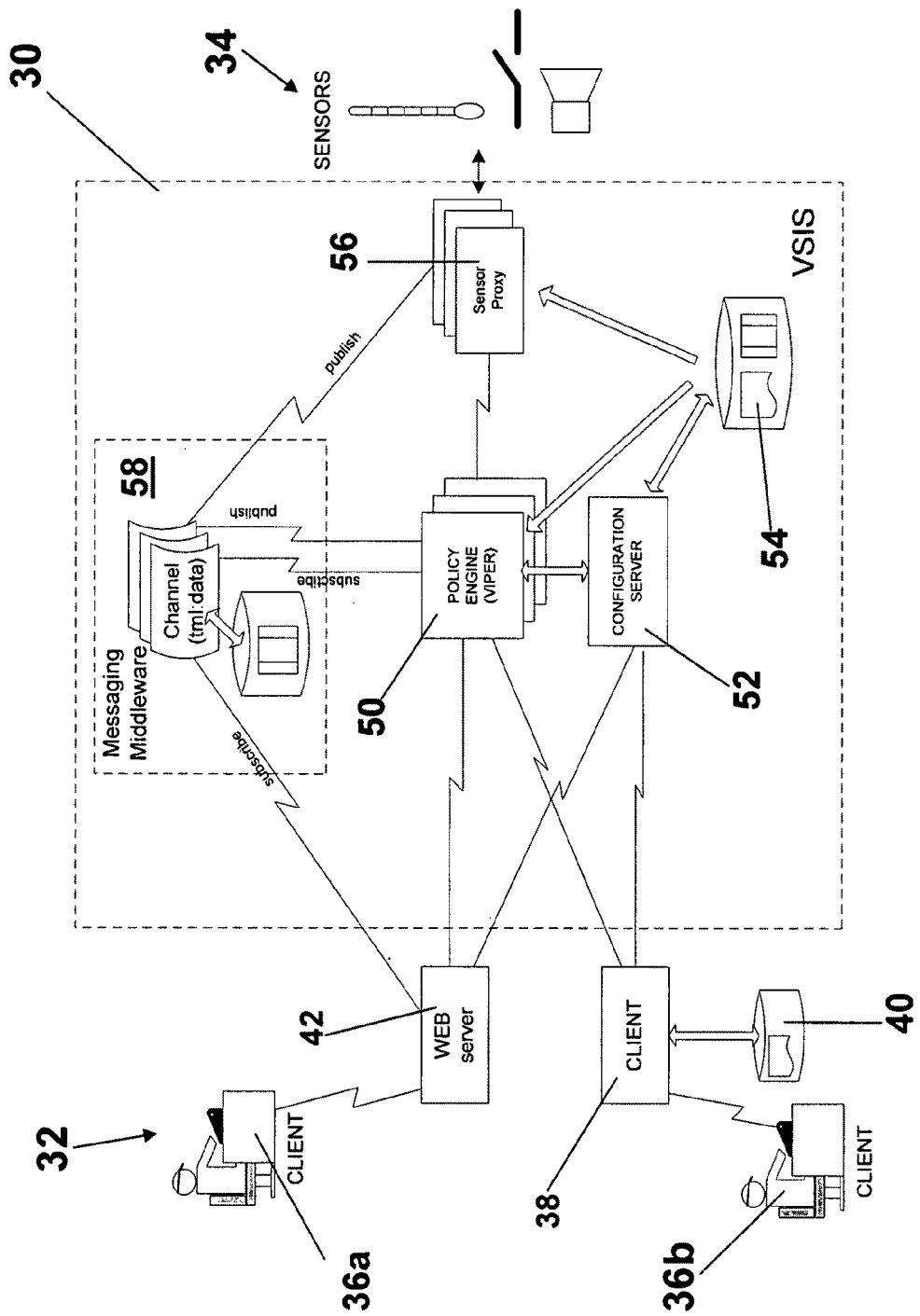
FIGS. 1-2 illustrate an example of a web-based sensor and video interoperability system and a deployment of that system, respectively.

FIGS. 1-7 illustrate an example of an implementation of a web-based sensor and video interoperability system 30 which may be known as VSIS. As shown in FIG. 1, the system 30 may be interposed between a client network 32 and a set of sensors 34 wherein the set of sensors may provide raw as well as derived and correlated data from sensors 34 connected to the client network. For example, the set of sensors may include one or more of real time location system (RTLS) sensors including passive and active radio frequency identification (RFID) readers, building management system (BMS) sensors including programmable logic controller (PLC) systems, distributed control systems (DCS) and supervisory control and data analysis (SCADA) systems, biometric sensors including automatic fingerprint identification systems and other biometric systems, chemical sensors, biosensors, nuclear sensors, video sensors including low resolution (less than 1 megapixel) visible spectrum sensors, high resolution visible spectrum sensors and thermal (infrared) sensors, and geographical information system (GIS) sensors that pull from a CAD format or a GIS database. The client network one or more client installations (for example, clients 36a and 36b in FIG. 1) wherein each client installation may interact with the system 30 using a client application 38 connected to a database 40 or a web server 42 as shown.

The system 30 is a product that works within the client architecture to provide user access to raw as well as derived and correlated data from sensors 34 connected to the client network. The sensors will be integrated in a manner that will completely hide form the user all the specifics of the sensors (protocols, data format, and network connection). Alerts and alarms are some examples of derived data but they can be as complex as reports or statistical correlations. The derived data are generated by executing policies that can be triggered either by events or scheduled at predefined times. The policies can be triggered by arbitrarily complex conditions and the actions are structures composed of a large set of primitive commands. There will be no limitation on the number of sensors and or policies. In the system, a policy is a prescribed plan or course of action of an entity intended to influence and determine decisions, action and other matters. The policies permits an automated response and control of a complex system. The sensors permit construction of a semantically rich policy representations that can reduce human error and address complex events. The sensor interoperability provided by the system allows administrators and users to reuse the policy management framework and modify system behavior (by modifying the policies or the sensor proxies) without changing the source code of the system every time a sensor is added, removed or changed.

The system 30 leverages existing standards which makes it easy to support new sensors as well as to add more primitive commands. The system is not specific to any domain of application as it is a framework that could be used with minimum effort to deploy and write applications in different domains. A rich set of generic primitives together with the system tools will assist the user in deploying and writing applications in different domains. The system is also a repository for domain specific expertise (experience) by allowing the user to instantiate new sensor proxies (drivers) and primitive (or derived) commands and store them in domain specific libraries. A new application in the same domain can build upon such libraries.

The system 30 may include one or more components (implemented in software, a combination of software and hardware or hardware such as an field programmable gate array (FPGA)) including a policy engine unit 50 known as VIPER, a configuration unit 52, a repository unit 54 and a set of sensor proxy units 56. The system may also optionally include a messaging middleware unit 58. In a preferred embodiment, the system 30 consists of a suite of distributed servers (for example, a VIPER server, a configuration server, etc.) covering different aspects of sensor data processing. Each unit is accessible through standard protocols that allow easy access of the clients to all system functionality as well as (network) location independence. The system 30 can be configured so that any number of servers can be started as needed to optimize the traffic and reduce overall response time and the system is therefore not limited to any particular number of or configuration of the servers. A client API (shown in FIG. 2) enables integration with any other Java client that may want access to the sensor network. In accordance with the invention, the system 30 is a distributed system since the processes of the system (described below in more detail) can be executed on different machines as long as they are on the same network with no firewall (or the port is open) to permit communication between the machines.

Figure 2:
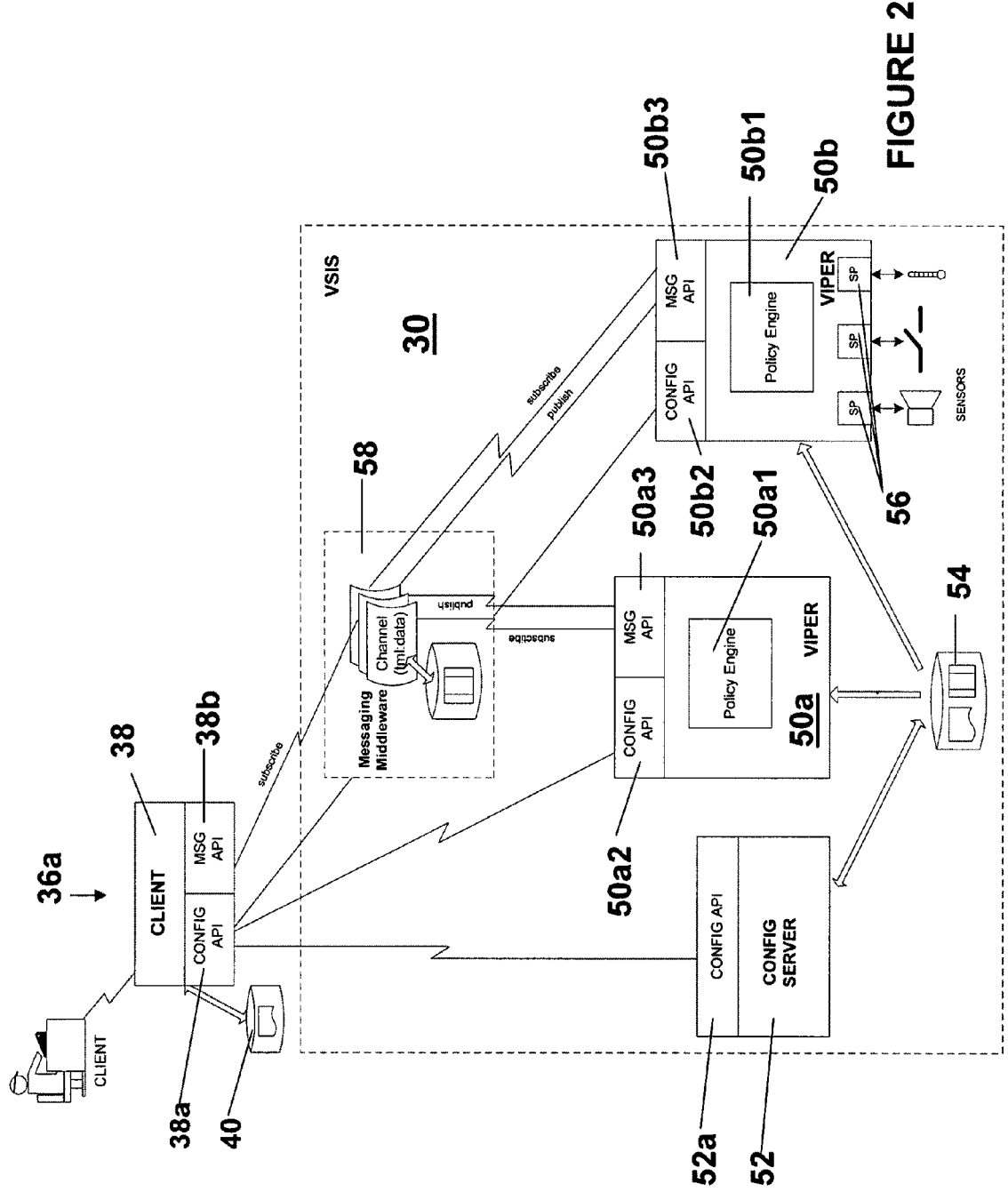

FIG. 2 illustrates an example of the deployment of the system 30. This deployment may contain two VIPER servers 50a, 50b wherein the server 50b is configured to do early processing of raw data from the three sensors and it incorporates the corresponding sensor proxies 56. The second VIPER server 50a does further processing but has no sensor proxy. As shown, each VIPER server may further include a policy engine 50a1, 50b1, a configuration API (50a2, 50b2) and a messaging API (50a3, 50b3). The configuration server 52 also has a configuration API 52a. The client 36a with the client application 38 may include a configuration API 38a that is used to configure and monitor the two servers 50a, 50b (as well as the configuration server 52) and a messaging API 38b that is used to subscribe to one or more data channels. The client 36a and the VSIS servers 50a, 50b can be hosted by the same machine or they can be distributed on different machines depending on availability and the expected traffic and how much CPU time it takes to run the policies.

For each type of sensor, the system may have a proxy 56 for each type of sensor wherein the sensors are wrapped into objects (proxies) that will create a standard interface and implement the protocol used by all the other components in the system. Thus, the proxies will insulate the system from the sensor specifics and create a framework for quick integration of new sensors in the system. In accordance with the invention, the system can integrate all kinds of sensors including: 1) read only sensors (these sensors publish data spontaneously, and do not implement any command); 2) read-write sensors (these sensors support configuration and polling commands and publish data on demand or spontaneously); and 3) read-only sensors (not really sensors because they do not publish data and are devices that can be controlled).

The policy engine 50a1 or 50b1 in FIG. 2 may store and implement a set of policies. The system 30 relies on policies to describe the processing that takes place with the system. Generally, a policy is a (condition, action) pair where a particular condition (if true) causes a particular action to occur. The policies are hosted and executed in the policy engines 50a1, 50b1 in FIG. 2. Each policy engine loads a different set of policies depending on the function it has in the system and the sensors it needs to support (to process the information published by the sensor) wherein the set of policies for each policy engine may be loaded from the repository 54. In the system, the user does not need to know where or how policies are being executed since the system will try to propose a distribution that is optimal meeting constraints on computing and network resources. While the clients use an remote procedure call (RPC) mechanism to execute configuration and control commands, the data is acquired using an asynchronous communication paradigm. In particular, the data producers (sensor proxies and policies) publish data and the consumers (client and the policy engine) subscribe and get notified when data become available (they are event driven).

For example, the conditions that are supported by the system may include one or more of a redline (a threshold condition for an engine/motor), a focus (if and when in range), an alarm, a track (if and when acquired), a watchlist (identifier for an object and a condition list), locate (geolocate, LBS ID, RTLS spot), correlate (auto and cross-correlate), assert (true, fail, unknown, ID, breach), rate (count, bin, frequency), count, spot (report, miss, hit, ID), confirm (success or fail), deny, trend, subscribe channel, export channel, encrypt channel, record channel and group channel. The actions supported by the system may include one or more of alert, alarm/silent alarm, locate/geolocate, geofence, enable/disable, activate/reset, syndicate, track, mobilize, log/archive, confirm, tag; deny/shutdown/lockdown, message, broadcast (mobilize, evacuate, quarantine) and acknowledge. The invention however, is not limited to the exemplary list of conditions or actions set forth above.

The system may also support user authentication and authorization as well as encryption on all the data feeds to provide a secure system. The system also permit the selective logging of the different data sources. In addition, the system will enable access to the historic data for any client application that might need to do forensic analysis. Now, each unit of the system (the VIPER, configuration unit, messaging middleware unit and the sensor proxies will be described in more detail. It should be understood that each unit can be deployed independently and the location of each component is controlled through the configuration.

Figure 3:
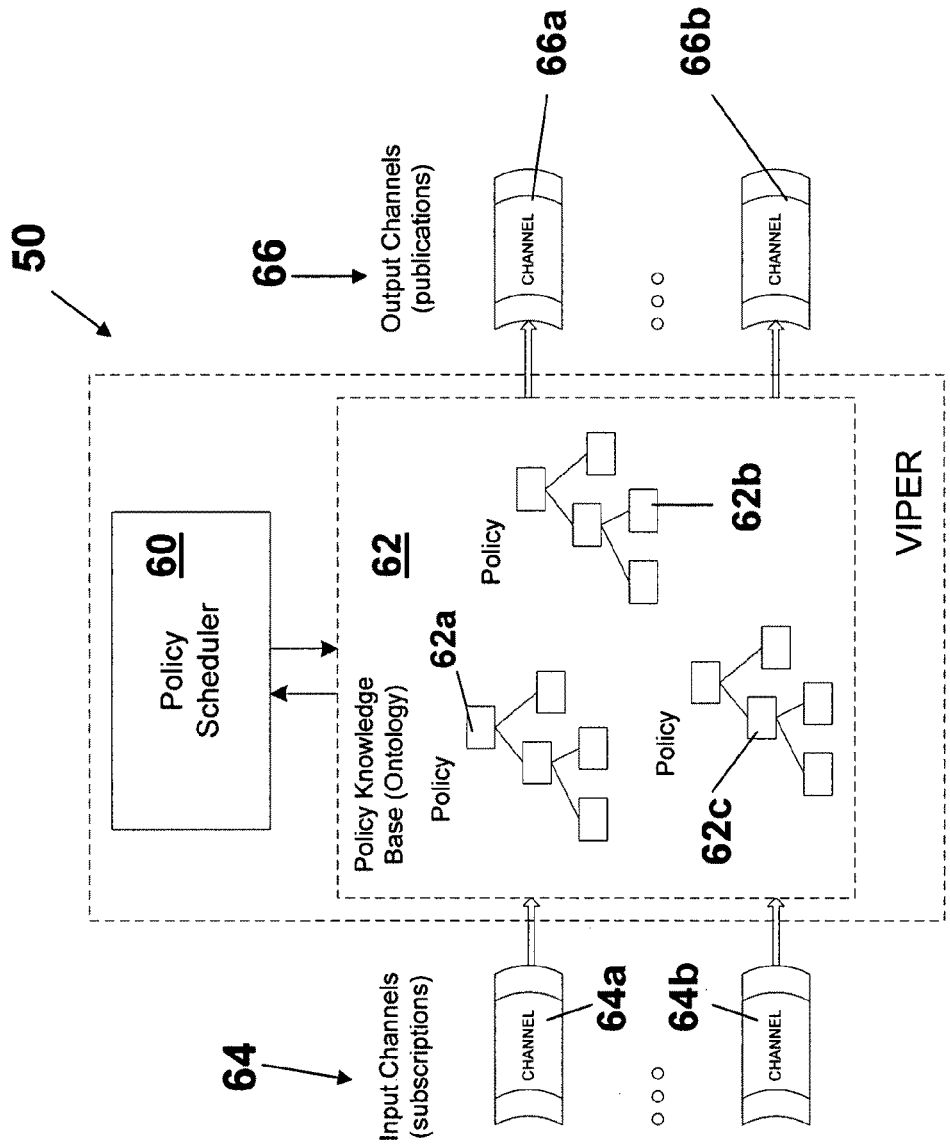
FIG. 3 illustrates more details of a policy engine of the system shown in FIGS. 1 and 2.

FIG. 3 illustrates more details of the VIPER unit 50 of the system shown in FIGS. 1 and 2. The VIPER unit 50 may further comprise a policy scheduler 60 and a policy knowledge base 62 wherein the policy knowledge base contains one or more policies 62a, 62b, 62c that are executed to perform the processing of the sensor data if the condition of the particular policy is met. VIPER is a central processing unit for the sensor data wherein VIPER subscribes to data sources over one or more input channels 64, such as input channels 64a, 64b shown in this example, and publishes data over one or more output channels 66, such as output channels 66a, 66b, to other data sources. The subscription to data and publication of data is done by the VIPER 50 based on the policies 62 executing on the particular VIPER. The VIPER 50 guarantees that a particular policy is triggered when the condition(s) for the particular policy are met.

The system 30 shown in FIGS. 1 and 2 may include multiple instances of VIPER 50 in any deployment wherein each VIPER would load a different set of policies in their knowledge base. The decision of what policies are being used in each VIPER 50 can be made based on various criteria, such as the proximity of the sensors or other load balancing criteria. The system 30 can provide assistance on configuring the different VIPER 50 instances by suggesting default configurations but the final decision will be made by the system administrator. The configuration of each VIPER is loaded at start up time from the persistent repository 54 of the system. The configuration contains all the policies that execute within each instance as well as the definitions of the channels that use these policies. In accordance with the invention, since the configuration for each VIPER is loaded at start-up time, the operation and functions of each VIPER 50 in a system 30 can be easily altered.

FIG. 4 illustrates more details of a policy 70 of the system. A policy is the basic building block for the system 30 and the policies are hosted and executed by a policy engine 50. A deployment of the system 30 may come with some default utility policies and some domain specific policies but the administrator can add more or customize the existing policies. Each policy 70 may be a data consumer (subscribing to one or more data sources through one or more channels) and a data producer (publishing generated/raw data to one or more data sources through one or more channels). Each policy is a pair: (<condition>, <action>) where the condition is a Boolean expression over the input channels 64 and the action is a sequence of primitive commands that may (among other things) publish data on output channels 66. The execution of the action part of a policy is controlled by the condition so that, only if the condition evaluates to true will the action part be triggered.

The condition of the policy may use logical operators which are the typical logical operators (AND, OR, NOT, eXclusive OR) with no depth limitation. The operands they act on are either channel fields or they are generated by comparison operators such as less than (LT), less than or equal to (LE), greater than (GT), greater than or equal to (GE), equal to (EQ) and not equal (NE) applied to arbitrary numeric or string expressions. A function invocation can be another source of Boolean operands. An example of a policy is attached hereto as Appendix A that is a part of the specification and is incorporated herein by reference.

The numeric expressions used in comparisons for a condition can use any/all arithmetic operators as well as predefined functions that return numeric values. When a function is invoked, the actual parameters can be general expressions of any type (numeric, string, Boolean). The condition can be an expression as complex as one can imagine (given the operators) but caution is recommended because of the way the conditions are used. The Policy Engine will evaluate a condition every time an event that might affect it is posted on the input channels. In an application with high frequency data reads, the Policy Engine may become a processing power hog just for checking the conditions, even if the action parts of the policies are never executed. The condition can use the current (most recent) values on the input channels or special statistical functions can be applied to historical data. For example a function can be used to return true if the values on a temperature channel have dropped more than 20 degrees within the last 10 minutes. Another function can return true if there is any jump of more than 5 degrees from one reading to the next (assuming a one Hertz reading frequency).

The action part of the policy is executed when the values on the input channels make the condition true. The action part of the policy may include a primitive action and/or a composite action. The primitive actions are predefined functions that perform the following categories of activities: 1) send commands to the sensors (read a value, set/change reading frequency, lock); 2) perform intermediate data processing on input data and publish results on output channels; 3) generate alerts or other signals for end user consumption or to trigger other policies; and 4) perform management and monitoring functions (generate trace information). In addition to the actual functions available in a library (deployed with the system) all the primitive actions also have associated metadata that describe their signature. A mechanism will be in place to allow easy addition of new entries in the library of predefined actions. This will allow creating a richer set of primitives that best serve a specific domain by reducing the effort to write applications.

The composite actions are when the primitive actions are combined to create complex actions to be used in the policies. Sequences, conditionals and different kinds of loops are examples of patterns used to create composite actions. The composite actions can in their turn participate to create actions of any complexity.

Each policy may start with a policy template since, in the process of writing an application, the user must first define the policy templates as generic rules acting upon input parameters (specified only by name and data types) and generating output parameters (also specified by name and data types) with no reference to specific data channels. These templates look very much like library functions for a programming language wherein only the function signature is known. The functions can be called with any actual parameters provided they have the appropriate (or compatible) type and a policy template specifies the condition and the action operating on the types of the input and output channels with no commitment on any actual channels to be used. In accordance with the invention, an application consists of a set of policy instances loaded into one (or multiple) Policy Engines 50. In summary, the Sensor Policy Manager (SPM) is a generalized network-centric, policy-based platform for delivering sensor, video and GIS interoperability. Specifically, the SPM provides IP-based sensor interoperability, standards-based sensor event notifications, sensor virtualization in a "product-format", integration of multiple sensors from multiple vendors providing data in multiple formats to a policy engine, extensive and complete policy framework for addressing multiple vertical requirements, capability for real-time response to mission critical events and guaranteed timeliness in sensor event processing.

The primitive actions have associated metadata describing their signature which makes them behave like templates. The types of the parameters can be scalar or structured (see the description below of the channels for more details of the supported types). In the system, no assumption is made on what the parameters actually are: entire messages or just fields in a composite message and the same applies to all policy templates. Both the expressions and the actions in a template use one or more parameter(s) that are described by their types only although all the parameters must also have a name. The templates can also specify that certain parameters are attributes of the same structure by using a distinguished name as described below.

An instance of a policy is a template used in a particular context created by real input and output channels of an application. The process of identifying the channels to be used by a certain policy is called binding. A policy instance is nothing more than a template and its bindings and a template can be used in multiple instances. An example of the grammar for the Sensor Policy Engine is contained in Appendix B.

The binding is a map from the set of formal parameters of the policy to the set of actual channels (or their attributes). No formal parameter should be left unmapped (unbound). Multiple parameters can be mapped to the same channel (attribute).

The policy scheduler 60 shown in FIG. 3 performs a policy scheduling strategy. In particular, every time a message is posted on a channel, all policies that have the condition bound to it are candidates for execution. Thus, those conditions are evaluated and if satisfied, the one or more policy actions are triggered. There is no predefined order in which the policies are tried. In accordance with the invention, channels with high frequency updates can generate a lot of activity in the policy engine hosting policies that depend on that channel so caution must be used when the policies are designed in this case. One possible solution is to have a high frequency channel used by a single (simple) policy that filters the messages and dispatches them on different channels (with lower update frequency) based on criteria that would make the data more specific (relevant) to second level policies.

The policy engine 50 may have a set of interfaces, such as an XML mediation layer, a SOAP layer, a socket layer (for secure messages) and a web services interface, that permit the policy engine 50 to communicate with the other components of the system 30. The policy engine 50 may further comprise a secure data syndication and caching unit, a command, control and reporting unit, a metadata layer, a business intelligence layer and a model layer. Now, the sensor proxies in accordance with the invention are described in more detail.

FIG. 5 illustrates more details of the sensor proxy 56 of the system 30. The only way a sensor can participate with the system 30 is by wrapping the sensor and its data into a sensor proxy 56. The sensor proxy creates a level of abstraction that will hide all hardware details from the other components in the system and from the client. Each sensor proxy is preferably a piece of software/software code resident on a machine local to the sensor. In particular, the unique aspects for each type of sensor are handled by the proxy sensor that is configured for the particular type of sensor so that the sensor data output from the sensor proxy has a uniform format, protocol and the like. In addition, the sensor proxies mean that a new type of sensor can be easily added into the system 30 at any time by simply creating a new sensor proxy for the new type of sensor.

The sensor proxy 56 supports command and control calls through a well known simple object access protocol (SOAP) interface. Each sensor proxy 56 may be set by the system using a set( ) command and the proxy sensor may get data from a sensor using a get( ) command or set the sensor parameters using a set( ) command. The sensor proxy 56 may then publish the data from the sensor (once the sensor data has been converted into a common format and protocol) using a publish( ) command to one or more output channels 66 as shown in FIG. 5. The interface of the sensor proxy is defined for each sensor class/type without going into the details of the specific sensor. The commands may refer to setting typical features of the sensor (like sampling rate, precision) or they may enhance the sensor with in-situ functionality like data filtering or conversion. A simple example of filtering would be to instruct the sensor proxy for a temperature sensor not to publish data unless the temperature gets over a certain low threshold. The proxy could also be instructed to publish, in addition to the actual reading, an alert (an event on an "alert" channel) when the temperature exceeds a high threshold level. Another feature that can be controlled at the proxy level is the units of the temperature. For example, the proxy can be configured to always publish the temperature in degrees Fahrenheit no matter what the physical thermometer is actually reading. The important point here is that the proxy can enable a sensor to comply to a higher standard (sophisticated, configurable) as long as the basic data is available. There may be sensors that can read both Celsius and Fahrenheit, and sensors that support low and high thresholds as they come from the manufacturer, but, using the sensor proxy, even a primitive sensor can do the same things as the more sophisticated sensor. In accordance with the invention, due to the sensor proxy, there is no system visible difference between the two different sensors.

Some of the sensors used in the system are read-only so that those sensors publish data periodically and do not accept any commands. For these read-only sensors, any configuration would be done using the hardware features of the sensor itself (knobs, switches). Some sensors are read-write so that they accept commands to change parameters like (sampling rate or precision) or to return data (they have to be polled—they do not publish data spontaneously). There is yet another category of devices that are not sensors (we can call them degenerate sensors) but are supported by the system 30 because they may play an important role in sensor related applications. These degenerate sensors are devices that are write-only since these devices do not provide any information about the environment but they can change the environment. Examples of these degenerate sensors are locks and switches. In most of the cases, these degenerate sensors will also confirm the success of the operation (turn of a switch for example) but the lack of the ability to confirm the success of the operation does not prevent the degenerate sensor from being integrated within the system 30 using a sensor proxy that is customized for the degenerate sensor.

The sensor proxy 56 may also provide another benefit since the proxy sensor can provide the physical location of the sensor, such as a mobile sensor that is GPS enabled or a fixed sensor. For those mobile sensors, the proxy sensor will simply make it available (publish) to a channel. The connection type and the protocol used by the sensor are also normalized by the sensor proxy 56. The sensor proxy is described in more detail in FIGS. 38-40 below and in Appendix C which is incorporated herein by reference.

In accordance with the invention, all sensors appear to the system 30 as having an IP address and a port (the connection type). As for the protocol, all sensor proxies will publish data using the known sensor model language (SensorML) which is an XML-based language for describing the geometric, dynamic, and radiometric properties of dynamic in-situ and remote sensors. More details of this known sensor model language is provided at http://www.opengeospatial.org/. In accordance with the invention, regardless of whether the sensor spontaneously pushes data or it has to be polled, the sensor proxy will make the sensor look like the sensor is always publishing data to channels of the system.

In accordance with the invention, any number of sensor proxies can be configured in the system 30. The sensor proxy configuration is loaded at startup time and controls all the aspects of its execution. The configuration can be subsequently changed through commands issued by the policies or by the client (the Administration Console for example as described below in more detail).

The sensor proxies 56 may have a set of interfaces, such as an XML mediation layer, a SOAP layer, a socket layer (for secure messages) and a web services interface, that permit the sensor proxy 56 to communicate with the other components of the system 30. Each sensor proxy 56 also has a secure data syndication unit, a command, control and reporting unit, a metadata layer, a business intelligence layer, a hardware abstraction layer and one or more sensor interfaces. Now, the sensor proxies in accordance with the invention are described in more detail.

The channels of the system (shown in the above figures) is the mechanism by which all data communication takes place asynchronously in the system. The channels in the system 30 are strongly typed so that each channel has a declared type and all the messages posted in the channel comply with that declared type. This type is defined by an XML schema that governs the format for each data packet on a specific channel. If for any reason a channel is meant to allow multiple types of messages to be posted, a catch all type (untyped or "any") will be declared but that would put the burden on the consumers to parse the content. In accordance with the invention, All messages will have an XML schema associated with them. For the untyped messages, the XML schema can be referenced in each message but no assumption can be made about the fields (attributes) so the message will be delivered as a block to the consumer as opposed to a collection of fields. Messages can also have MIME encoded attachments, as is the case with IP based camera video feeds which can be syndicated frame by frame and each frame would arrive as an attachment to a message.

The channels may be scalar channels or structured channels. The simplest type of channel is one that carries messages with a single scalar. The following scalar types are supported for channels: 1) integer; 2) double; 3) Boolean; and 4) string. There is no need to name the field of a scalar channel as the ID of the channel would be enough to name it. Most of the channels will have more than one field and is therefore a structured channel. In fact, even if the actual (live) data is a scalar (temperature or pressure), the sensor will likely include a few other qualifiers such as for example timestamp, location and/or units of measure. The attributes of a message have a unique ID (within the type scope) and a type, scalar or structured. For the structured attributes, they can be arrays and other structures. An array is a collection of homogenous attributes with the types being scalar or structured. The type of a structured message can be of any depth. The elements of a structure referred by name (within the scope) and the elements of an array are referred by position. Now, the configuration unit of the system is described in more detail.

Referring again to FIG. 1 or 2, the configuration unit (which may be a server in a preferred embodiment, has the role of mediating the access to the metadata repository 54 for all clients (among which the administration console plays an important role) as well as the system components that may need to modify the configuration. The policy engine 50 may execute commands that dynamically change the configuration and those changes are mediated by the configuration unit to guarantee consistency. At startup time, all system components will load their configuration from the database 54 directly. The configuration server will support a checkpoint call to allow the user roll back changes to a stable (tested) configuration.

The system components will negotiate with the configuration server to get their dynamic configuration updates while in operation and at startup. The configuration server also provides security services since it checks the identity of the users at login time and authorizes access to the system resources (metadata, policies, and channels). Some of the objects that are persistently stored in the repository and accessed through the configuration server may include users, groups, permissions, policy templates and instances (described above), channels (definitions), sensor proxy configurations and policy engine configurations of the system. The configuration server will expose a SOAP interface that can be used by both end users (the Administration Console described below) and by the other components in the system. The policy engine 50 and the sensor proxy 56 will both read their configuration from the repository by using API calls to the configuration server. The configuration unit may have one or more interfaces, such as an XML mediation layer, the SOAP layer and a web services interface. Now, the messaging middleware will be described in more detail.

Referring again to FIGS. 1 and 2, the messaging middleware unit 58 manages the asynchronous communications data transfer paradigm (even though the configuration and control commands use the RPC SOAP mechanism to access the corresponding services). The asynchronous data transfer paradigm enables the de-coupling between the data producers (sensors proxies and policy engines) and the data consumers (clients subscribing to data and other policy engines). The asynchronous communication allows the consumers to register observers to the channels of interest and get notified when the data becomes available without having to poll the data sources so that consumers are event driven.

In accordance with the invention, any number of consumers can subscribe to the same channel. This multicast feature can easily be implemented without the data producer having to do anything for that and the multicast feature can be controlled by the configuration. Another important advantage of using messaging middleware software comes from its ability to store the data in a persistent repository 54 before delivering it. Since the system 30 is a distributed system, the connection between the data producers and the data consumers can be temporarily broken. If guaranteed delivery is needed for some sensor readings (or derived results) then the corresponding channels should be configured as persistent. Using this mechanism, once the data has been successfully published to the repository it will be available to any client (subscriber) even if the sensor is not online at the time of the publication. Now, the administration console is described in more detail.

Referring to FIG. 2, the client 38 may include an administration console which is a browser based graphical user interface (GUI) that allows the user to configure and access all the resources in the system 30. The administration console may perform configuration and monitoring functions of the system. The administration console may be used to define and configure various types of resources including a channel type, a channel instance, a policy template, a policy instance, a policy engine configuration and a sensor proxy configuration. The console may also be used to monitor the activities of the system 30 which may include a subscription to channels and/or watching the traffic, checking the state of different components of the system and/or monitoring the traffic and the policies being triggered at each Policy Engine.

The channels can carry either raw data from the sensor (proxies) or derived data generated by policies wherein the policies can be written to publish on dedicated channels of any information type from the simple fact that the policy itself has been triggered (publish the policy ID) to complex logging. The monitoring capability totally relies on the subscription to channels. As for the actual content of the channels, the administrator will be responsible for defining (and make sure they get triggered) the right policies.

Figure 6:
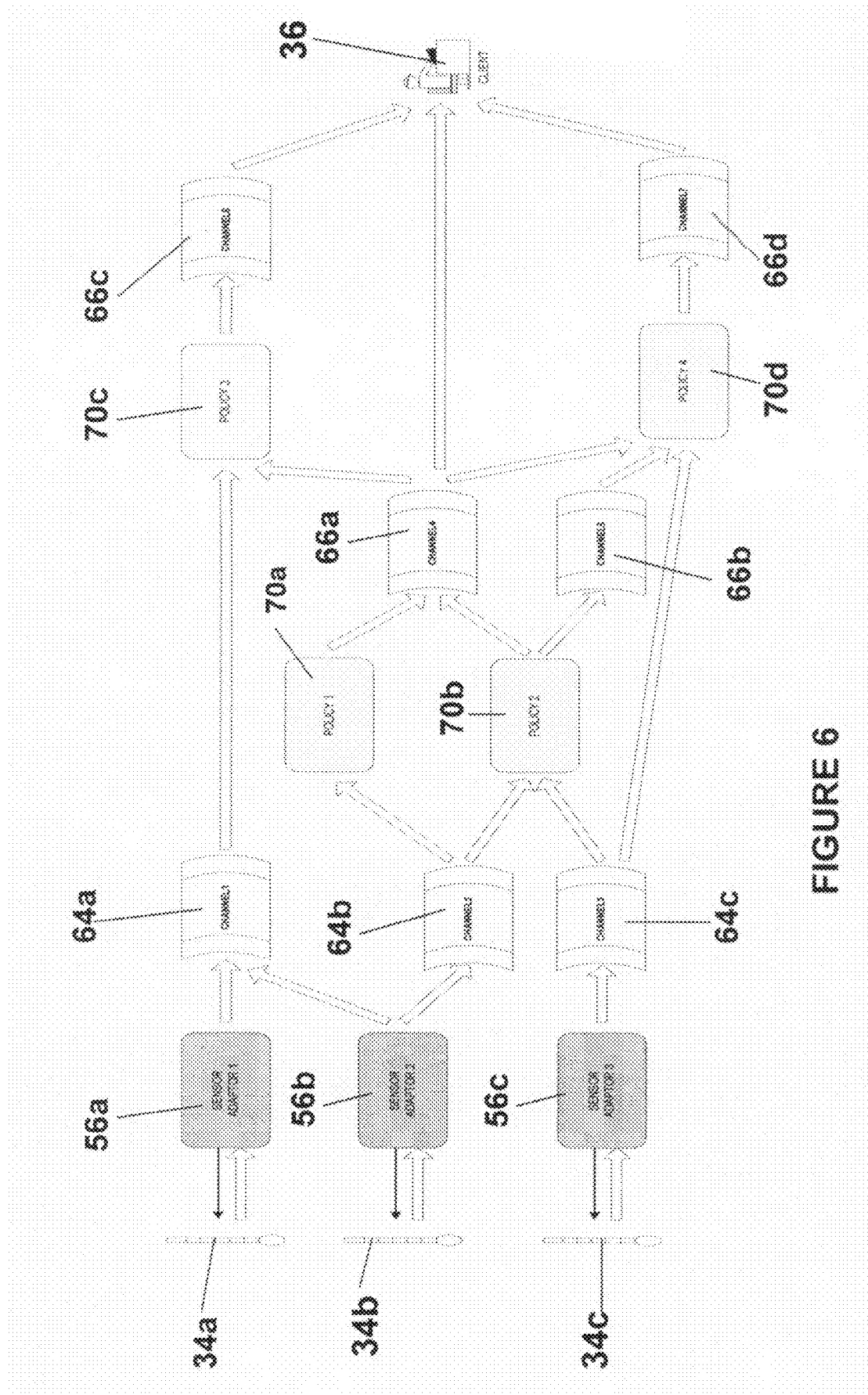
FIG. 6 illustrates an example of an application for the system shown in FIGS. 1 and 2.

FIG. 6 illustrates an example of an application 80 for the system shown in FIGS. 1 and 2. The application 80 can be seen as a puzzle that can be grown indefinitely using the two functional patterns created by the sensor proxy 56 and the policies wherein the underlying idea is that the channel is the only way data is being communicated and there are no back doors, special interfaces or protocols that different components can use to transfer data. As shown in FIG. 6, the application shows channels being shared (subscribed to) by both policies and clients and it also illustrates policies publishing data to multiple channels. It should be pointed out though that it represents the logical structure of the system and does not reveal anything about the mapping of the functional entities to physical resources.

Resource allocation is important for system optimization and it becomes very important for large systems where poor performance can make them impractical. It is also a major concern in the system 30 where scalability is important. To this end, the system 30 will suggest resource allocation strategies that could be used to drive (to some degree) the resource mapping since the resource allocation can definitely be done in an automatic way to improve (not necessarily optimize) the performance of the system. The performance is measured in terms of network load and CPU load. For example, one can think of the policy engine as being a process that can easily be loaded on any platform. If there are a number of policies sharing the same channels one can bundle all of them in the same knowledge base and make them driven by the same policy engine. This will reduce the traffic by having only one copy of the data loaded moved to that machine alone instead of replicating it to multiple machines hosting the policies.

Configuration optimization can become a difficult problem when policies are defined with a particular resource allocation scheme in mind. For example, if the pieces of information for some of the rules need are bundled in a blob then a single policy can be defined so that the blob is processed only once instead of moving it around. For example, some image processing (pattern matching) algorithm should be executed early on by the first policy that gets a hold of a picture instead of letting it wander around for other policies that may need pieces of it (timestamp, location, or other details). Other issues like event incidence (frequency) and level of importance can also be factors to influence the resource allocation.

Figure 7:
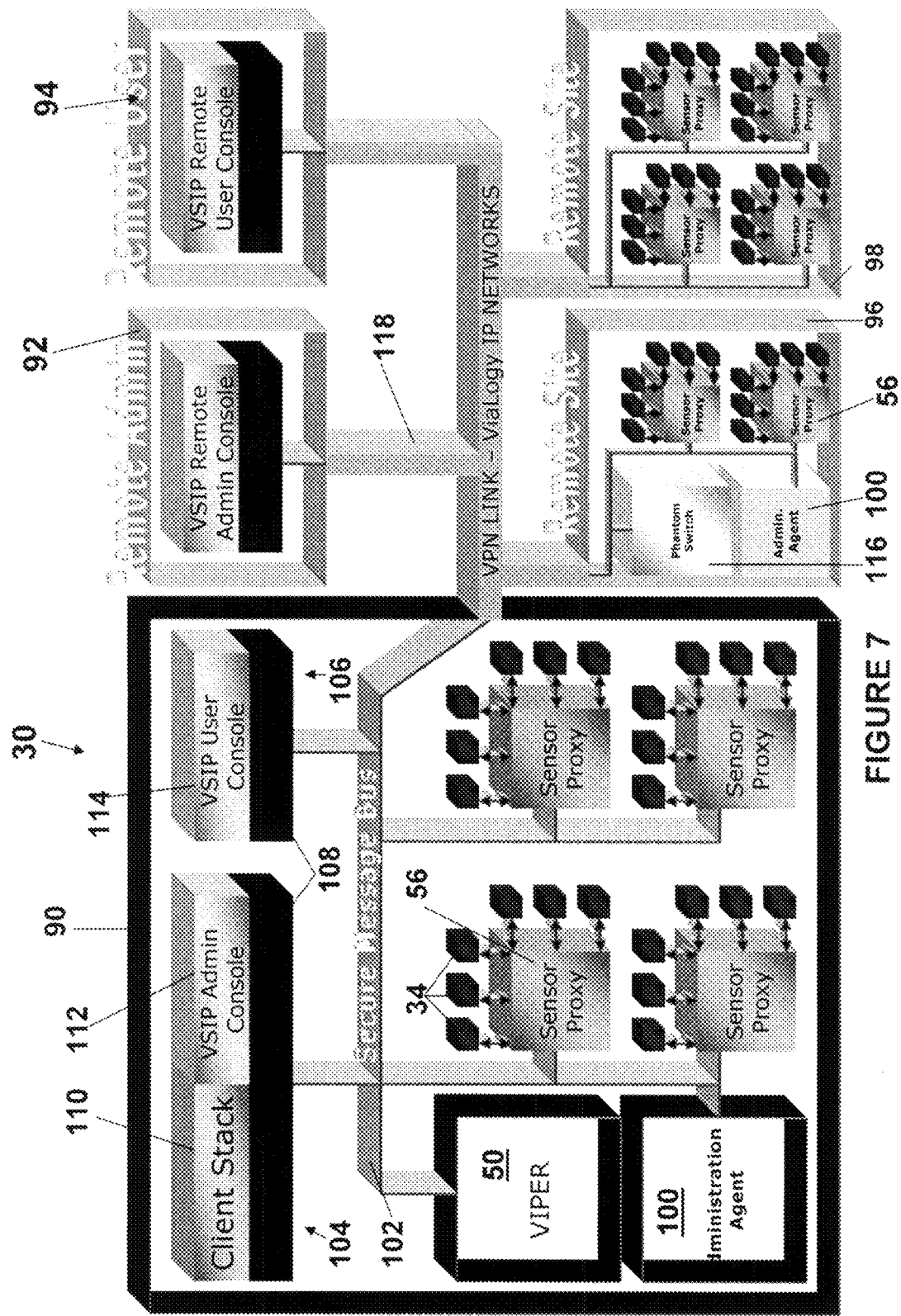
FIG. 7 is a diagram illustrating an example of another deployment of the web-based sensor and video interoperability system.

FIG. 7 is a diagram illustrating an example of another deployment of the web-based sensor and video interoperability system 30 that has a primary location 90, a remote administration location 92, a remote user location 94 and a first and second remote sites 96, 98 wherein the sensors 34 at the remote sites 96, 98 are controlled by the policy engine 50. The primary location 90 may include the policy engine 50, an administration agent 100 (the configuration unit 52) and one or more sensor proxies 56 connected to sensors 34 which are all coupled together by a bus 102 such as a secure message bus in the preferred embodiment. The primary location 90 may also include a client unit 104 and a user console unit 106 wherein each has a set of APIs 108. The client unit further comprises a client stack 110 and an administration console 112 while the user console 106 further comprises a user console application 114. The remote administration unit 92 permits a user remote from the primary location to perform administration operations and functions from the remote location. The remote user unit 94 permits a remote user to take actions that a user might be able to do at the primary location. One remote site 96 may include a phantom switch 116 and an administration agent 100. The one or more remote sites 96, 98 are coupled to the primary location 90, the remote administration unit 92 and the remote user unit 94 over a link 118 such as a virtual private network link in the preferred embodiment of the system.

Figure 8:
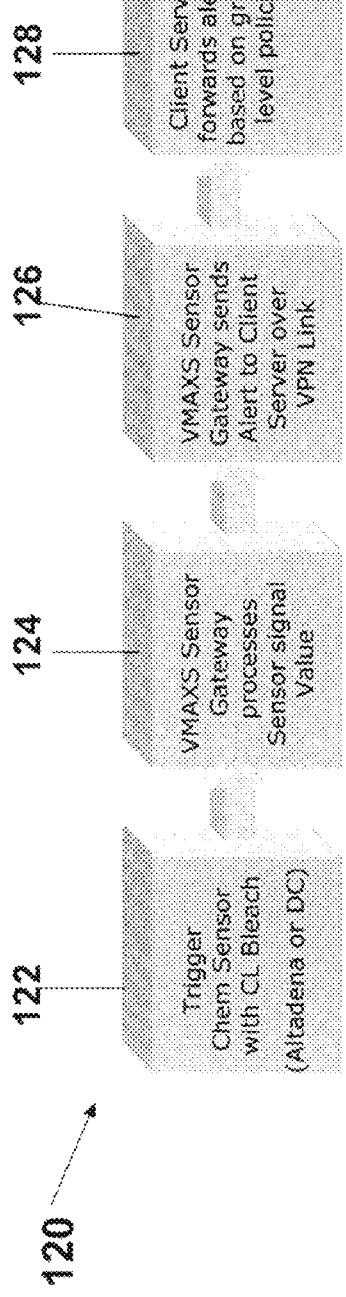
FIGS. 8-11 illustrate examples of the operation of the web-based sensor and video interoperability system when processing a sensor.

FIGS. 8-11 illustrate examples of the operation of the web-based sensor and video interoperability system when processing a sensor. In particular, FIG. 8 illustrates a method 120 for processing a sensor signal. In step 122, a chemical sensor is triggered with chlorine bleach at a location in which a chemical sensor connected to the system is located. In this example, the chemical sensor generates a value indicating the level of the chlorine sensed by the sensor. In step 124, the sensor proxy for the particular chemical sensor (typically at the location of the sensor) performs its functions (including the conversion of the sensor data format into a common format and protocol) and processes the sensor signal values. In step 126, the policy engine executes a policy associated with the sensor output (the condition) and performs an action based on the condition. In this example, the policy sends an alert to the client 36 over the communications link. In step 128, the client may distribute the alert to one or more users based on a set of group level policies that dictate which users receive the particular alert based on a triggering of the chemical sensor.

Figure 9:
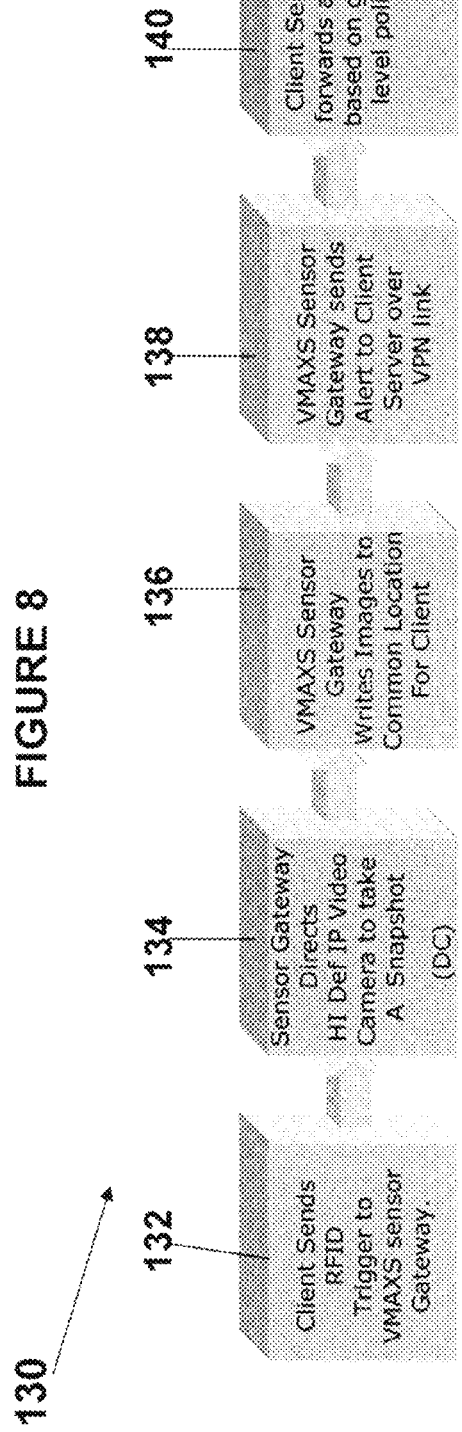

FIG. 9 illustrates a method 130 for processing a different sensor signal in accordance with the invention wherein a client can trigger a sensor event. In this example, in step 132, a client sends an RFID trigger to the policy engine. In step 134, the policy engine and the sensor proxy (for the particular type of sensor) command an IP video camera (the sensor) to take a snapshot. In step 136, the sensor proxy gathers the images from the video camera and writes the images to a location (storage unit) for the client that requested the triggering of the video camera. In step 138, the policy engine executes a policy associated with the sensor output (the condition) and performs an action based on the condition. In this example, the policy sends an alert to the client 36 over the communications link about the completed video camera images. In step 140, the client may distribute the alert to one or more users based on a set of group level policies that dictate which users receive the particular alert based on a triggering of the video camera.

Figures 10, 11:
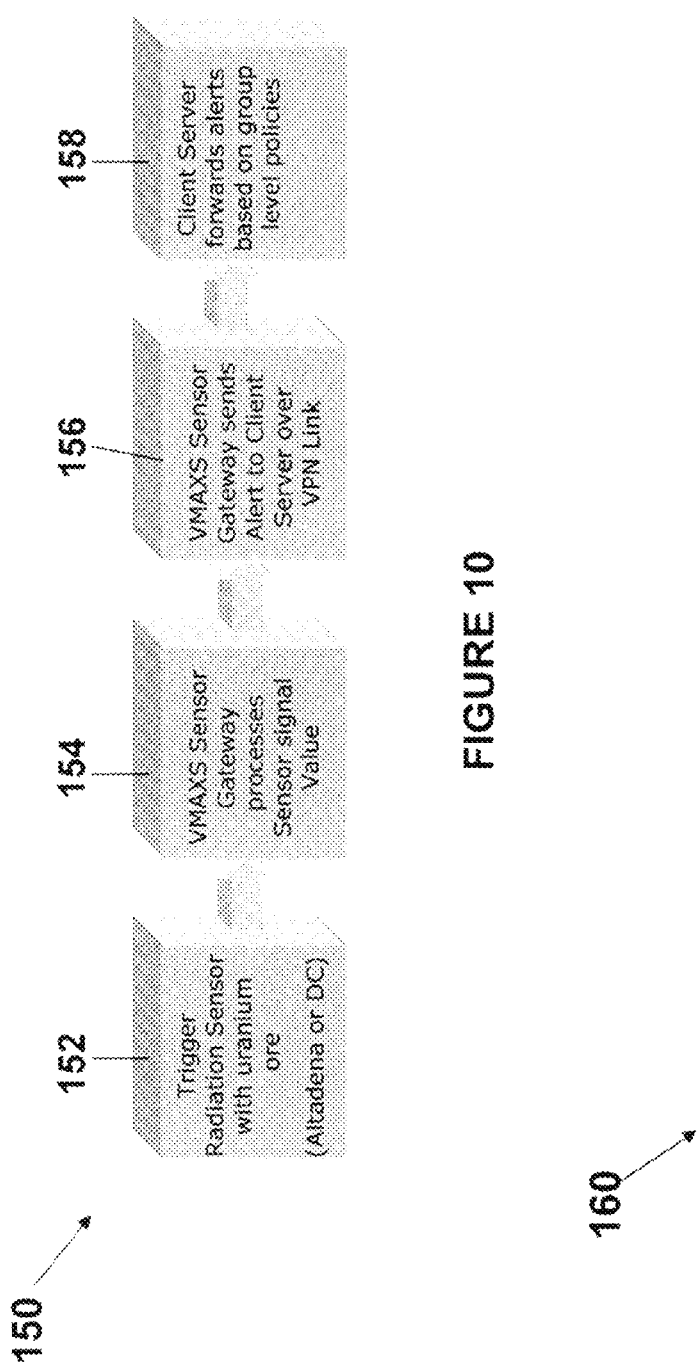

FIG. 10 illustrates a method 150 for processing a sensor signal of another type of sensor. In step 152, a radiation sensor located at a site of uranium ore is triggered wherein the radiation sensor is connected to the system. In this example, the radiation sensor generates a value indicating the level of the radiation sensed by the sensor. In step 154, the sensor proxy for the particular sensor (typically at the location of the sensor) performs its functions (including the conversion of the sensor data format into a common format and protocol) and processes the sensor signal values. In step 156, the policy engine executes a policy associated with the sensor output (the condition) and performs an action based on the condition. In this example, the policy sends an alert to the client 36 over the communications link. In step 158, the client may distribute the alert to one or more users based on a set of group level policies that dictate which users receive the particular alert based on a triggering of the radiation sensor. FIG. 11 illustrates a similar method 160 in which the output from a bio sensor for airborne non-toxic contaminants is sensed, processes and distributed using similar steps as shown in FIG. 10. Now, examples of the user interface of the system shown in FIGS. 1-2 and 7 will be shown in more detail.

Figure 12:
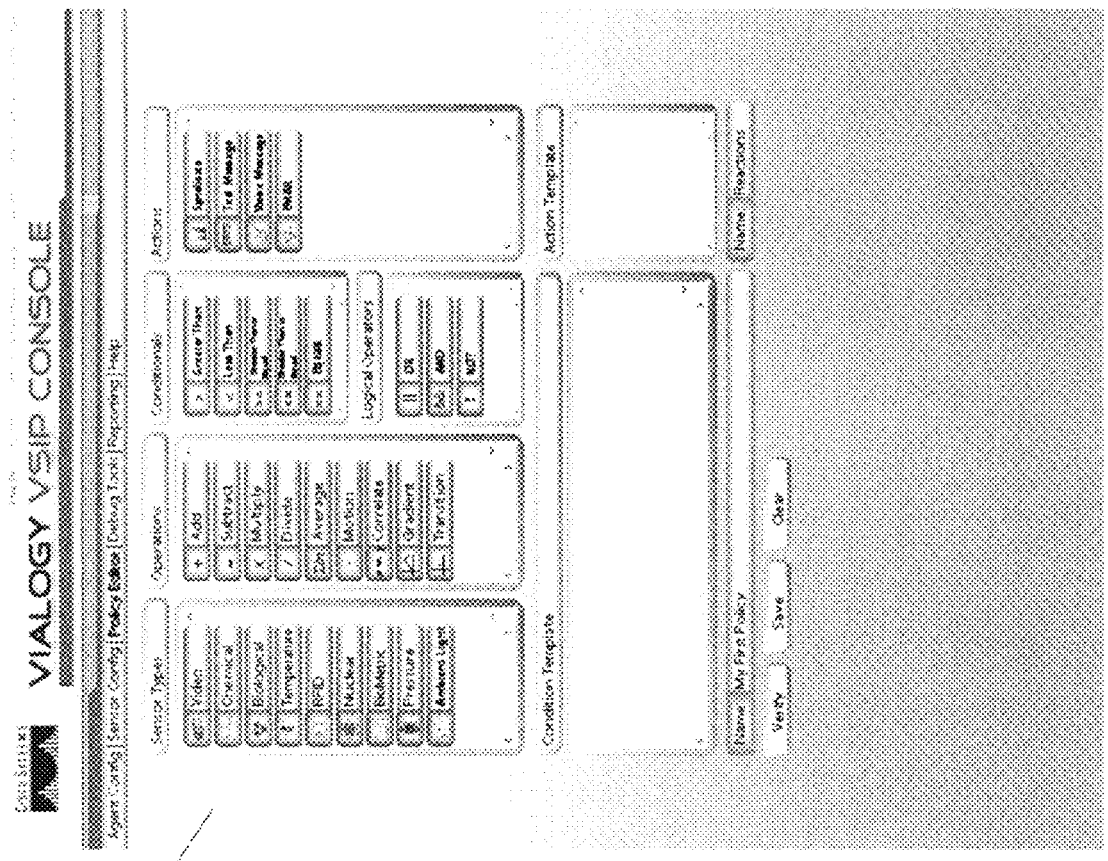
FIGS. 12-16 illustrates examples of the user interface of the web-based sensor and video interoperability system.

FIGS. 12-16 illustrates examples of the user interface of the web-based sensor and video interoperability system and in particular the administration console 112 and user console 114. The consoles provide an administrator and user, respectively, with a user interface to interact with the system. For example, FIG. 12 illustrates a user interface screen 170 by which an authorized user or an administrator is able to create, modify or delete the policies of the system. For each new policy, the user interface permits the user to select a type of sensor that is part of the policy, a type of operation, a conditional or logical operator and an action associated with the policy. The user interface may also provide the user with one or more condition templates and one or more action templates. From FIG. 12, it is apparent that the system 20 permits an authorized user of the system to easily create, modify or delete a policy of the system.

Figure 13:
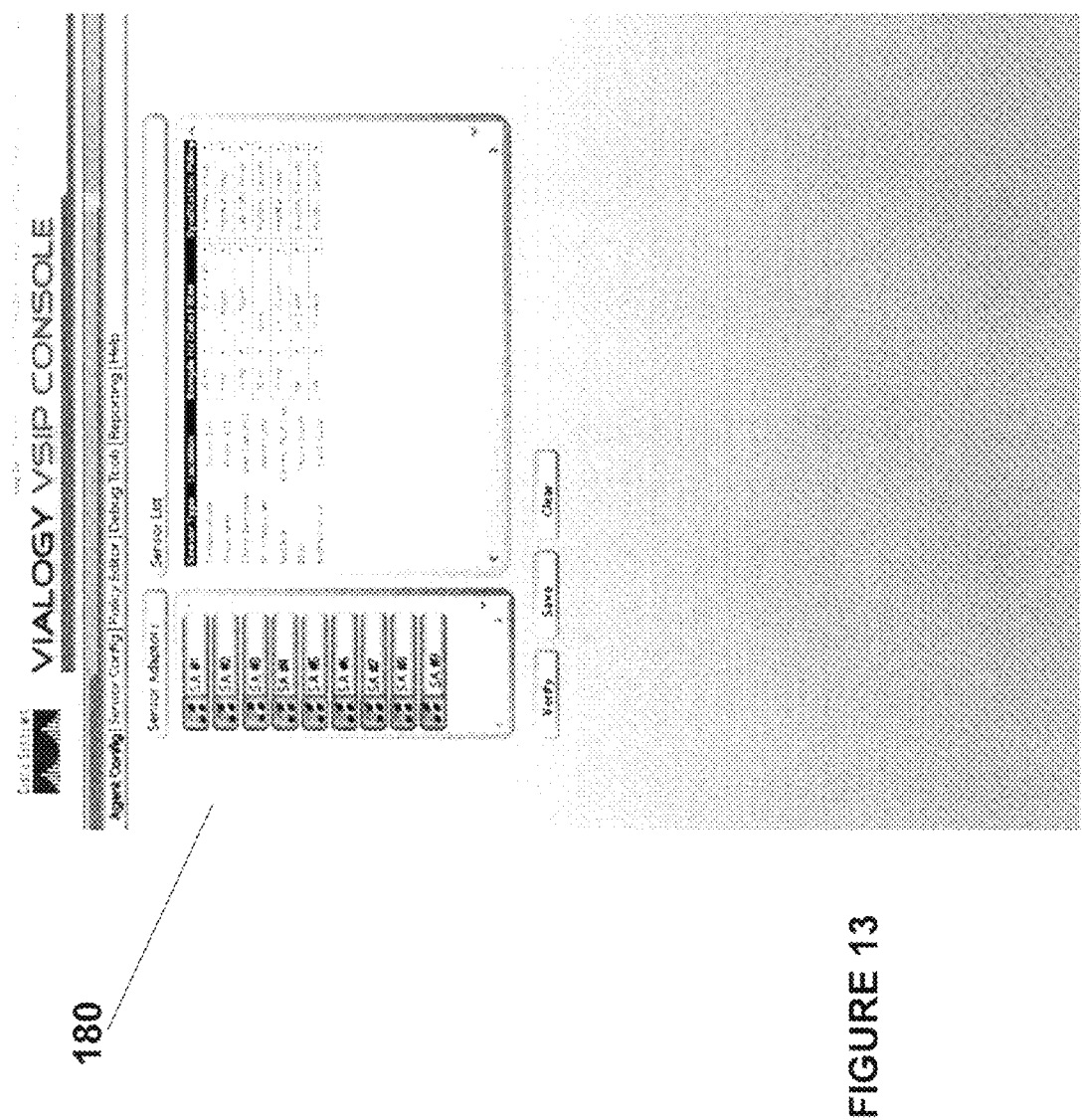

FIG. 13 shows an example of a user interface 180 for configuring the sensor proxies (depicted here as sensor adaptors) and sensors of the system 30 shown in FIGS. 1,2 and 7. The user interface may include a list of sensor proxies that can be adjusted and modified by a user with the appropriate authority. The user interface also lists one or more sensors wherein each sensor has a sensor type, a location, a sample rate, a data filter and a syndication policy associated with the particular sensor. As shown in FIG. 13, an authorized user can change the sample time of a sensor, change the data filter of the sensor and change the syndication policy of each sensor. The syndication policy is the policy (executed by the policy engine) that determines to which users/group of users an event notification about a sensor will be sent.

Figure 14:
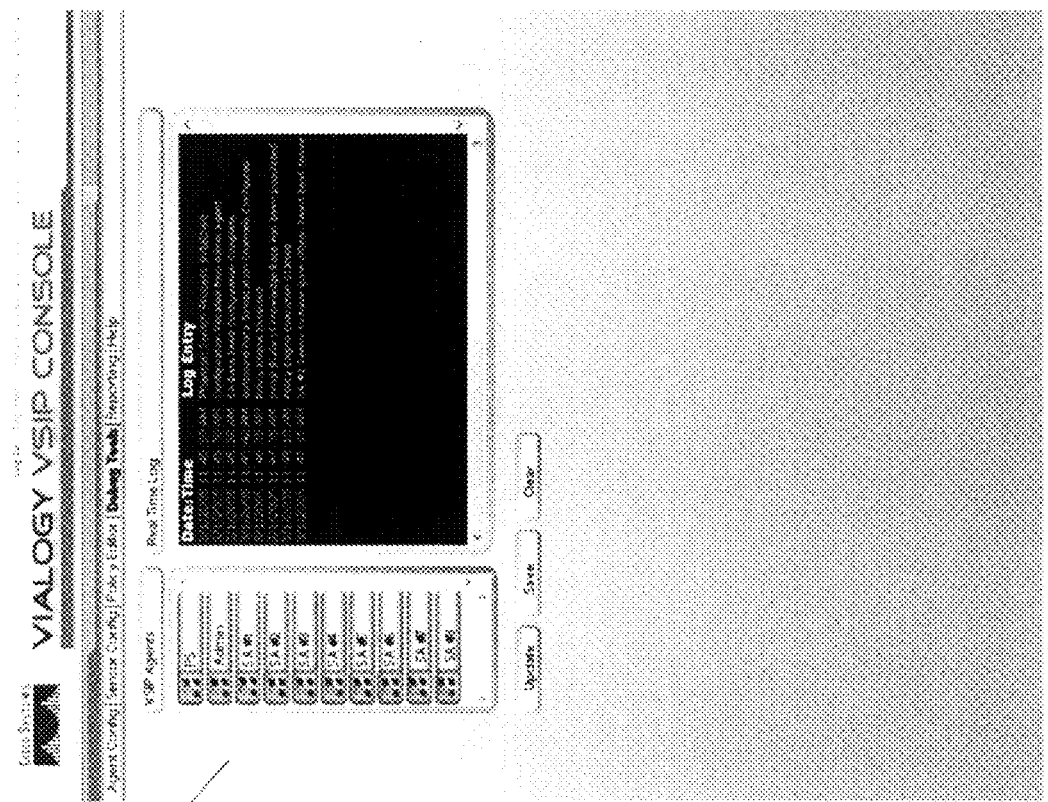
Figure 15:
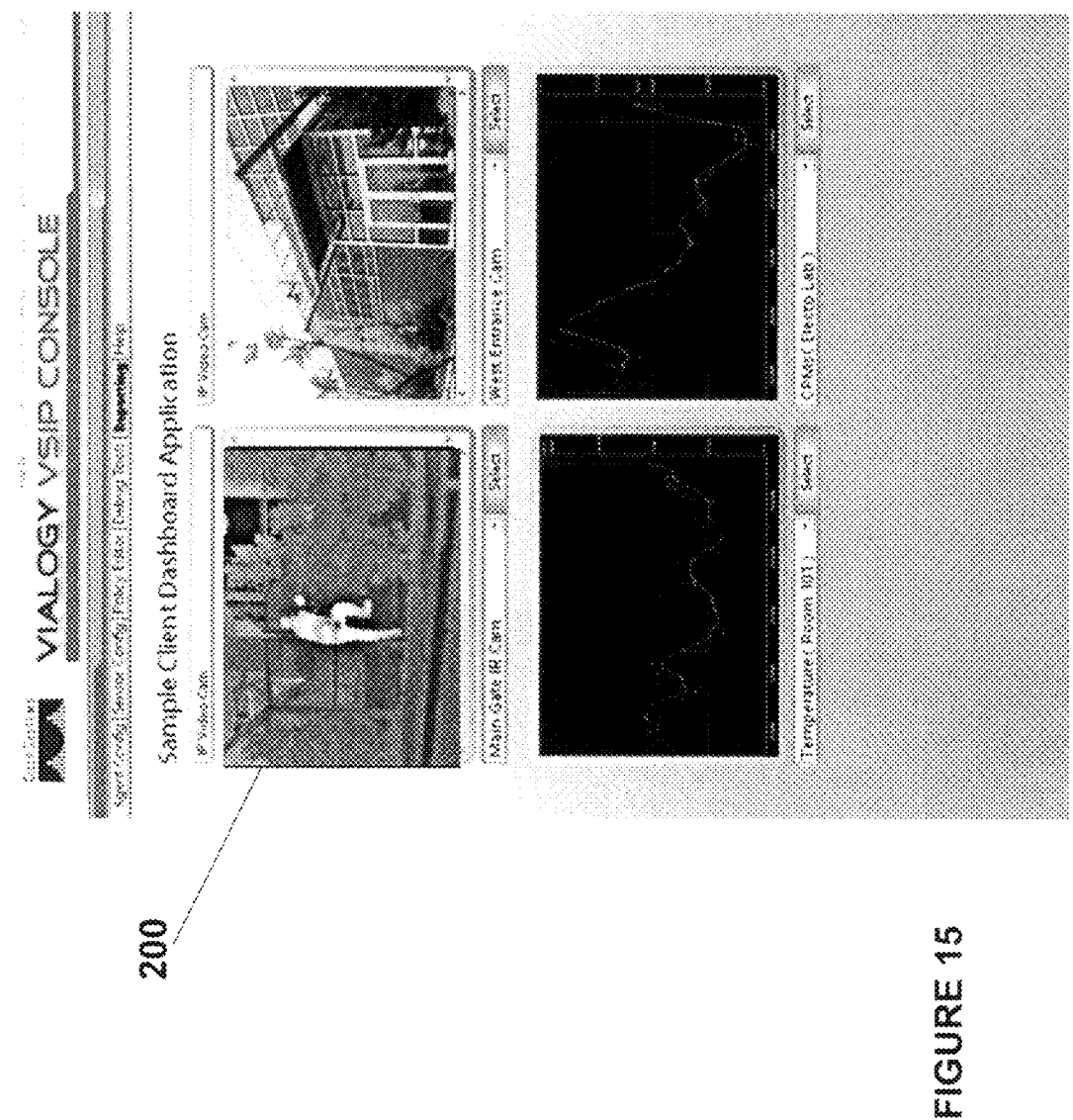

FIG. 14 shows an example of a user interface 190 that shows the real-time log of the web-based sensor and video interoperability system. FIG. 15 shown an example of a user interface 200 showing the results of the processing of one or more sensors of the system wherein the user can configure which sensor outputs/results form part of the user interface. In the example shown, the reporting user interface is displaying video information in combination with other sensor information (temperature in a room and CPMs) to the user. For the exemplary video data shown in FIG. 15, the video data includes IR data and visible spectrum data. Thus, the system is able to receive data from video and other sensors and combine that data together.

Figure 16:
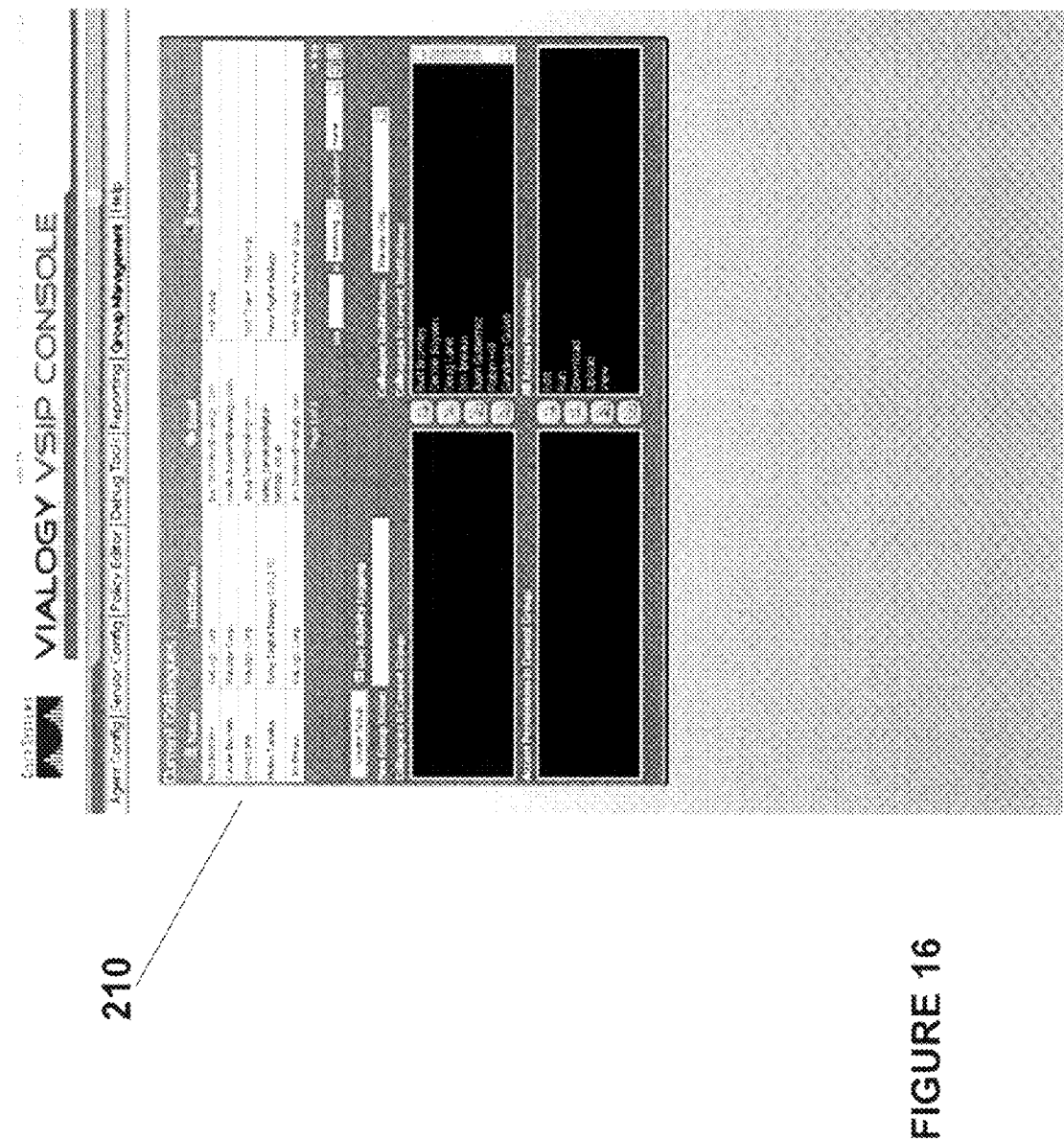

FIG. 16 shows an example of a user interface 210 of a group management screen of the system 30. The group management screen permits an authorized user, such as an administrator, to create, modify or delete a group of users and/or colleague institutions. The colleague institutions are a group of all user for a particular organization with the access privileges for those users of the institution. For each group, the user interface permits the authorized user to select one or more users for the group as well as the access privileges for the particular group. Thus, the system permits the authorized user to specify a plurality of groups wherein each group may have a different or same group of users and a different/same access privileges for the group so that the system permits various levels of granularity of the access privileges for each user of the system.

Figure 17:
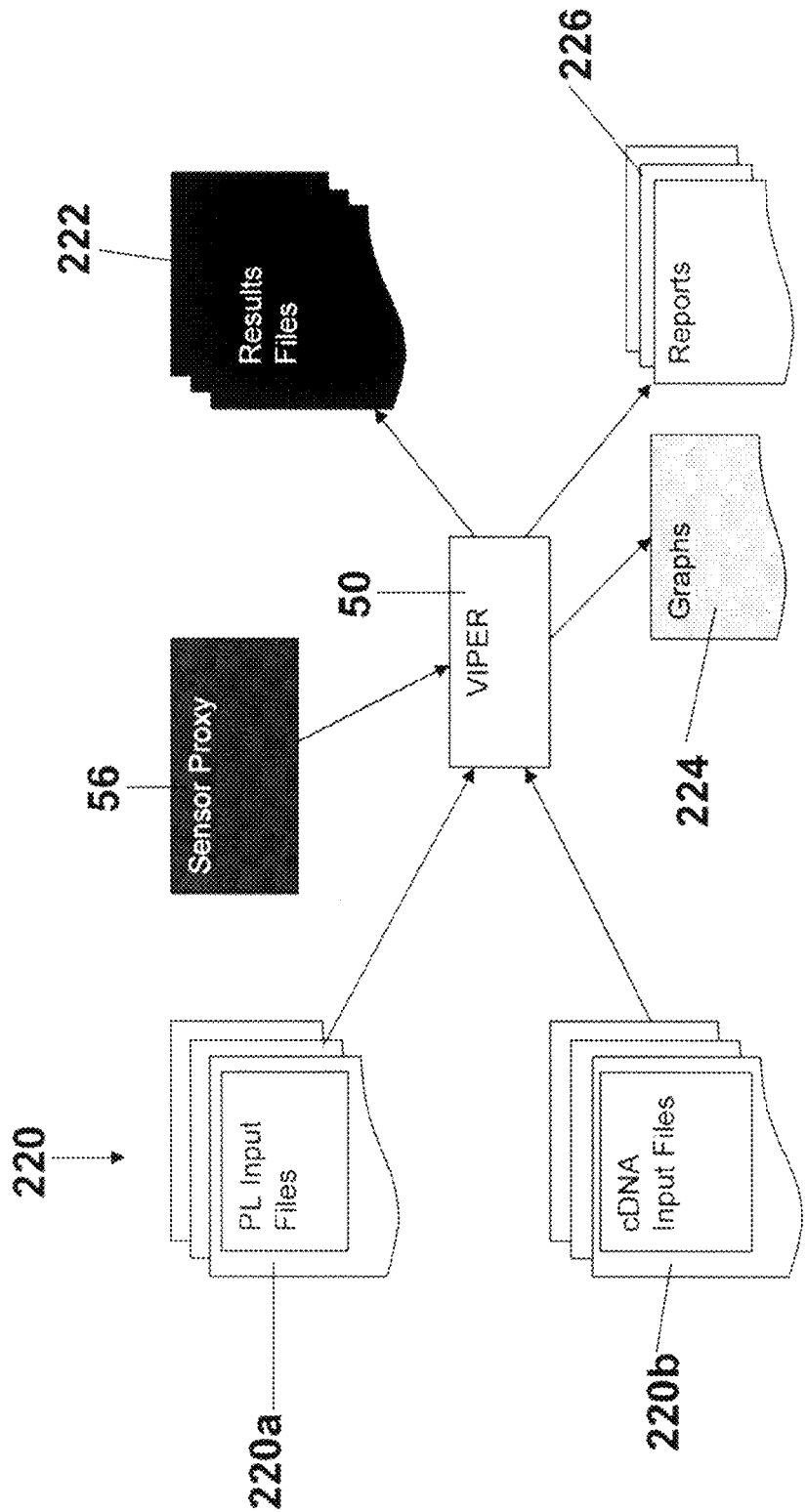
FIG. 17 illustrates more details of the inputs and outputs from the policy engine.

FIG. 17 illustrates more details of the inputs and outputs from the policy engine 50 known as VIPER which is a very high-density policy encoder. The policy engine receives input files 220 produced by any one of several commercial applications as well as data from the sensor proxies 56. The input files contain a variety of fields that typically include call information, signal intensity, and statistical information such as mean, median and standard deviations of intensity. There are many other fields for which support is also provided. The policy engine provides at least the following functions and operations including: 1) a direct comparison of results from different applications (since the data is in a common format); 2) performing complex set operations on results (intersections and unions.); 3) providing complex mathematical filters on result information; 4) allowing the user to view result information and carry out multi-level sorts and filters on viewed results information; 5) allowing the user to set up persistent file sections that allow the user to view and/or write only selected fields from a particular set of results; 5) allowing multiple views of the same or different sets of results to co-exist at any one time; 6) providing file output capability for any of the sets of results originally input or any results that have been modified by VIPER operations; 7) providing the capability to generate graphs based upon any two file columns; 8) calculating some basic statistics on a gene by gene basis wherein these statistics are mean, median, coefficient of variance, standard deviation, maximum and medium; and 9) performing simple calculations between different columns of data.

Thus, the policy engine 50 received both inputs files 220a and files 220b. The invention however, is not limited to any particular input files or file types as the system may be used with other input files and file types. As shown in FIG. 17, the policy engine 50 may generate one or more outputs/output files such as a results file 222, a graph 224 and a report 226. Now, the metadata associated with the policy engine will be described in more detail.

Figure 18:
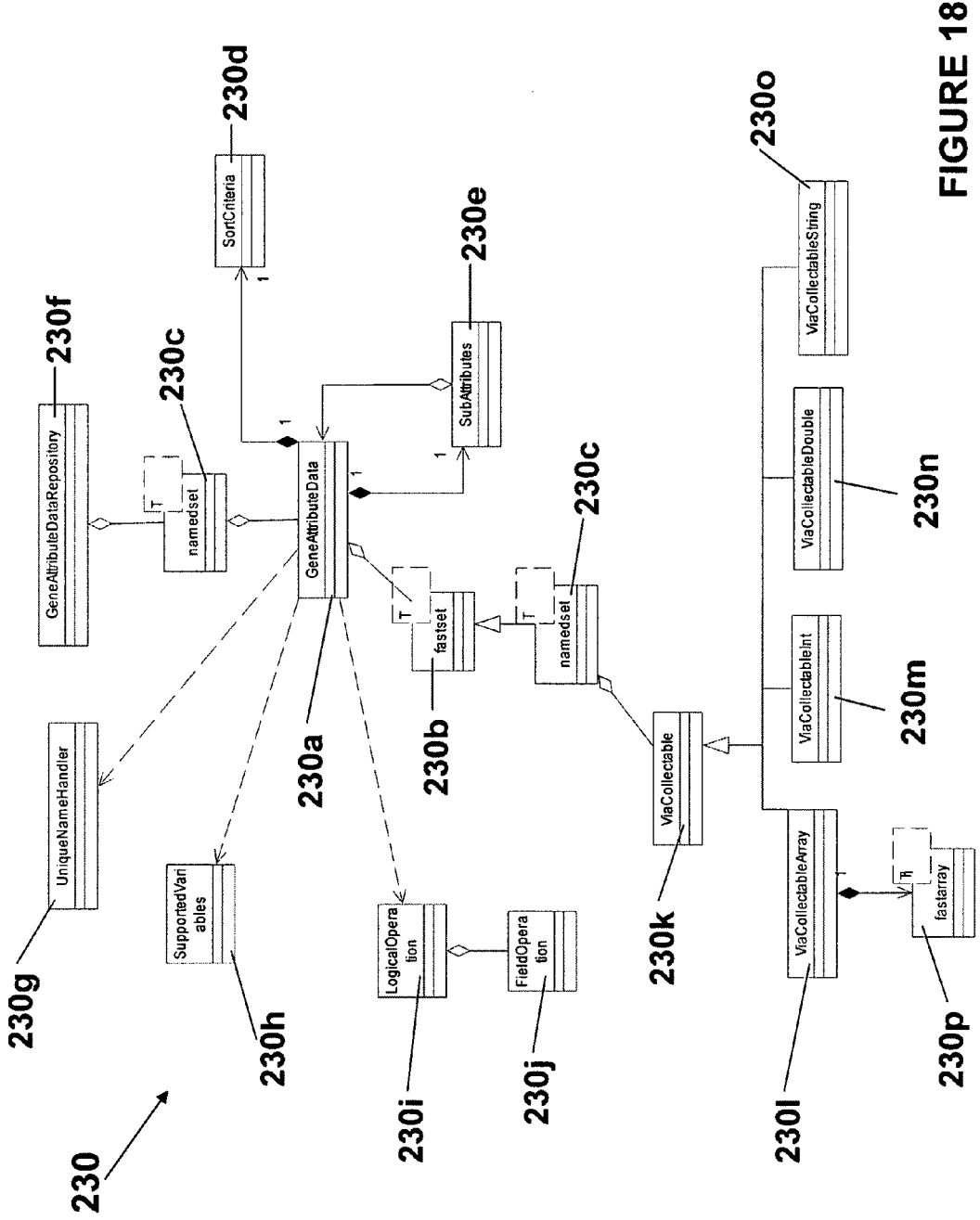
FIG. 18 is a metadata class diagram of the policy engine.

FIG. 18 is a metadata class diagram 230 of the policy engine 50. In particular, the policy engine is preferably implemented in JAVA using object oriented programming in which the data structures of the policy engine are objects and object classes such as those shown in FIG. 18. The classes shown in FIG. 18 are the classes used by the policy engine to performs the functions and operations of the policy engine. The classes may include a AttributeData class 230a wherein all arrays and results files for the policy engine 50 are stored in memory as a named set of AttributeData objects. The classes may also include a fastset class 230b that is similar to the Standard Template Library set and is used because it requires less memory resources than its STL counterpart (about 40% less) and a namedset class 230c is a subclass of fastest and adds the capability to name the set and to provide a free-format string as user data. These classes are shown in more detail in FIG. 19. The classes may also include a subattributes class 230e that stores one or more sub-attributes of the system data. The classes may also include a AttributeDataRespository class 230f that contains the objects that store the arrays and results files.

The classes further include a set of helpers to the main metadata classes that may include a sortcriteria class 230d, a uniquenamehandler class 230g, a supportedvariables class 230h, a logicaloperation class 230i and a fieldoperation class 230j. The SortCriteria is an elementary container class held by every AttributeData object and used for sorting and filtering. The UniqueNameHandler is used to format a key (name) for each AttributeData. The SupportedVariables are another container that is passed to each AttributeData object as a part of the initialization and used by the object to find out what ViaCollectable objects it supports and to allocate the memory for these. The LogicalOperation and FieldOperation objects are used by AttributeData during Gene Call and Mathematical Filter operations.

The classes may further include a viacollectable class 230k which may further include a viacollectablearray 230l, a viacollectableint class 230m, a viacollectabledouble class 230n, a viacollectablestring class 230o and a fastarray class 230p. A single instance of a ViaCollectable represents an individual attribute for a particular gene in an array. e.g. signal, p-value. etc. ViaCollectable is an abstract class and its subclasses which may be instantiated are ViaCollectableArray, ViaCollectableDouble, ViaCollectableString and ViaCollectableInt. This is a very lightweight class holding only an id (integer) and a value type corresponding to its own kind. E.g. A ViaCollectableArray holds a single fastarray<double>.

Figures 19, 20:
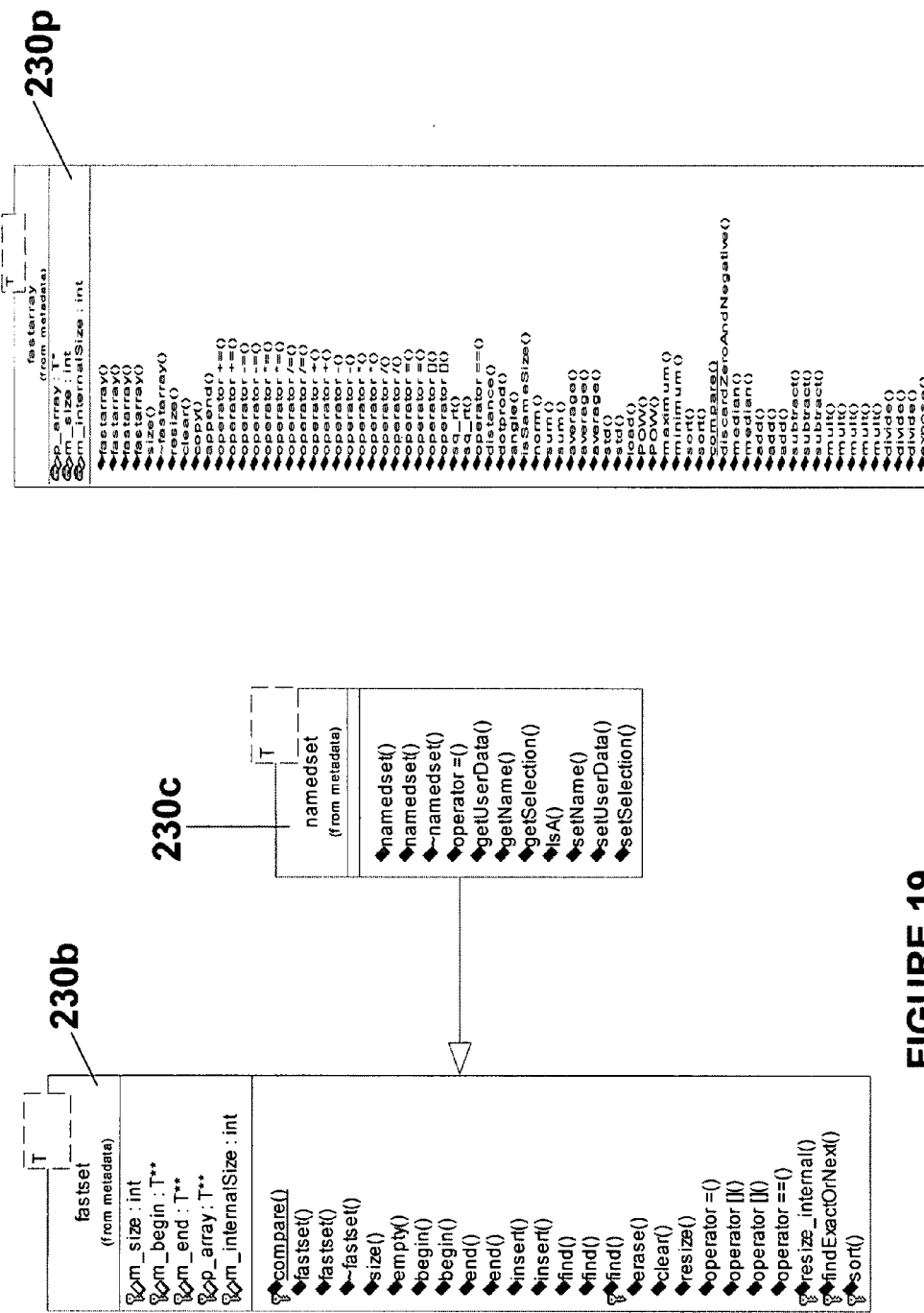
FIG. 19 illustrates more details of the fastset and namedset classes.
FIG. 20 illustrates more details of the fastarray class.

FIG. 20 illustrates more details of the fastarray class 230p. Fastarray is a better performing implementation of the known STL valarray and replaces the valarray. In addition, it contains some methods for sorting and for making elementary mathematical calculations.

FIG. 21 illustrates more details of the AttributeDataRepository class 230f which is a singleton repository class. It contains all array and result files loaded or generated by the policy engine. FIG. 22 illustrates more details of the AttributeData class 230a wherein the AttributeData class contains one gene entry in an array wherein, sometimes this corresponds to a single line within a text file. The object is able to hold a collection of its own kind, thereby allowing the concept of a sub-attribute data.

Figure 23:
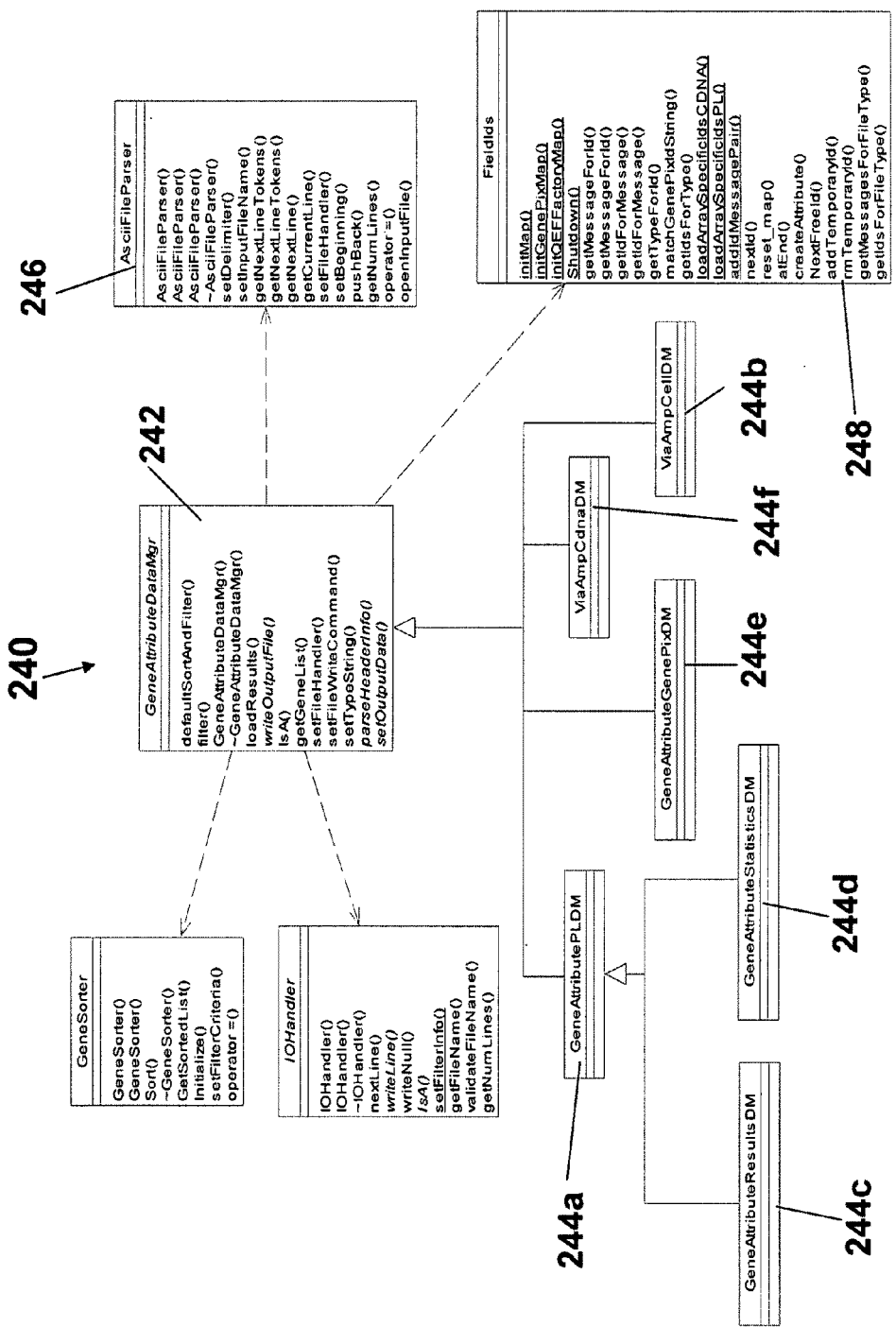
FIG. 23 illustrates a file loader/writer class of the policy engine.

FIG. 23 illustrates a file loader/writer class 240 of the policy engine. Each file loader/writer class derives from an abstract class AttributeDataMgr 242. The file loader/writer classes operate to permit the system to interface with external applications and system. In one embodiment, the system may have six loaders which include: a PL loader (GeneAttributePLDM 244a) that supports a ViaAmp loader (ViaAmpCellDM 244b) that supports ViaAmp files where there is cell (feature) level information; a results loader (AttributeResultsDM 244c) for results files produced after an intersection or union operation in PL mode; a statistics loader (AttributeStatisticsDM 244*d*) for files generated from the statistics modules; a data picture loader (AttributeDataGenePixDM 244*e*) for Pix files; and a ViaAMP loader (ViaAmpDM 244*f*) for ViaAmp files and files where there are multiple datapoints in a single file.

For loading, the virtual parseHeaderInfo method is invoked to map the input file columns to identifiers and to provide any other information required to load the file. A loadResults method is invoked in order to load up the array information and store it in the AttributeDataRepository singleton object. Each DataManager class has a contained AsciiFileParser object 246, used to read the file and parse it into fields. A setOutputData method is invoked to determine the columns (ids) to print out and to obtain any other information required to print out a file. A writeOutputFile method is invoked to write out the file. A FieldIds object 248 contains a static collection of all identifiers used to identifier a particular column, including the associated strings (column headers) and types (floating point, integer, string, array.)

FIG. 24 illustrates an I/O handler object model 250 of the policy engine. An IO handler subclass must be passed into the DM class in order to successfully read or write a file. The IOHandler itself is abstract and provides the pure virtual methods that must be invoked. The class may include a FileHandler object 252 and a CFileHandler 254 that encapsulate the GUI CFile and CArchive objects respectively. A Non-GUIFileHandler 256 uses the standard "C" library calls rather than GUI and a NullFileHandler 258 is a do nothing handler that is used if there is a need to determine the list for sorting or anything else of this ilk but no requirement to print anything. If a ViewerHandler 259 is passed to a DM class and a file write carried out then the information will appear in a grid rather than in a file output. The ViewerHandler is supported only for file write since reading the information in a grid is considered to be of low value (since it is easier to access the underlying metadata object.)

FIG. 25 illustrates a dialog box/command object class 260 of the policy engine. The policy engine consists of a series of services encapsulated within self-contained dialog boxes. Where appropriate, these dialog boxes are modeless. Typically, such a service consists of an GUI dialog class containing a non-GUI command class (as shown in the diagram below for cDNA statistics.) The GUI class has the duty of loading user-selected GUI information to its contained command object. It then calls the virtual Execute method on the command object and loads the results back into the GUI. The command class has the duty of carrying out all processing not intimately connected to the GUI itself, but the command class has no knowledge of the GUI dialog box object containing it which is the command design pattern. An example of this is shown in FIG. 26 for the statistics module.

Figure 26:
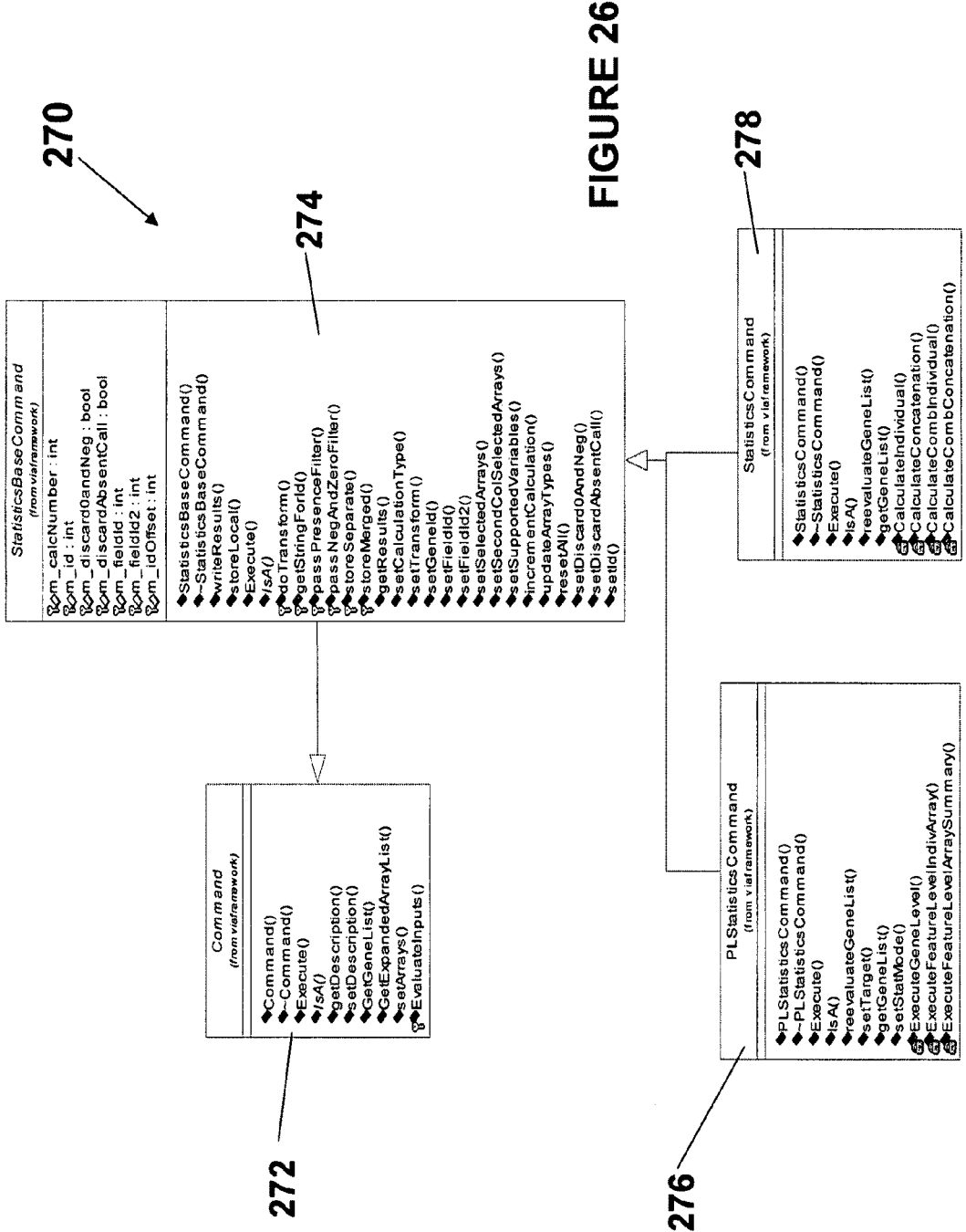
FIG. 26 illustrates a statistics command inheritance hierarchy of the policy engine.

FIG. 26 illustrates a statistics command inheritance hierarchy 270 of the policy engine. In accordance with the invention, all command objects inherit from the abstract base class "command" 272. For statistics, there are two further levels of inheritance. The first level of StatisticsBaseCommand 274 is also abstract and contains generalized methods. The final level of inheritance contains the individual concrete statistics commands 276, 278.

Figure 27:
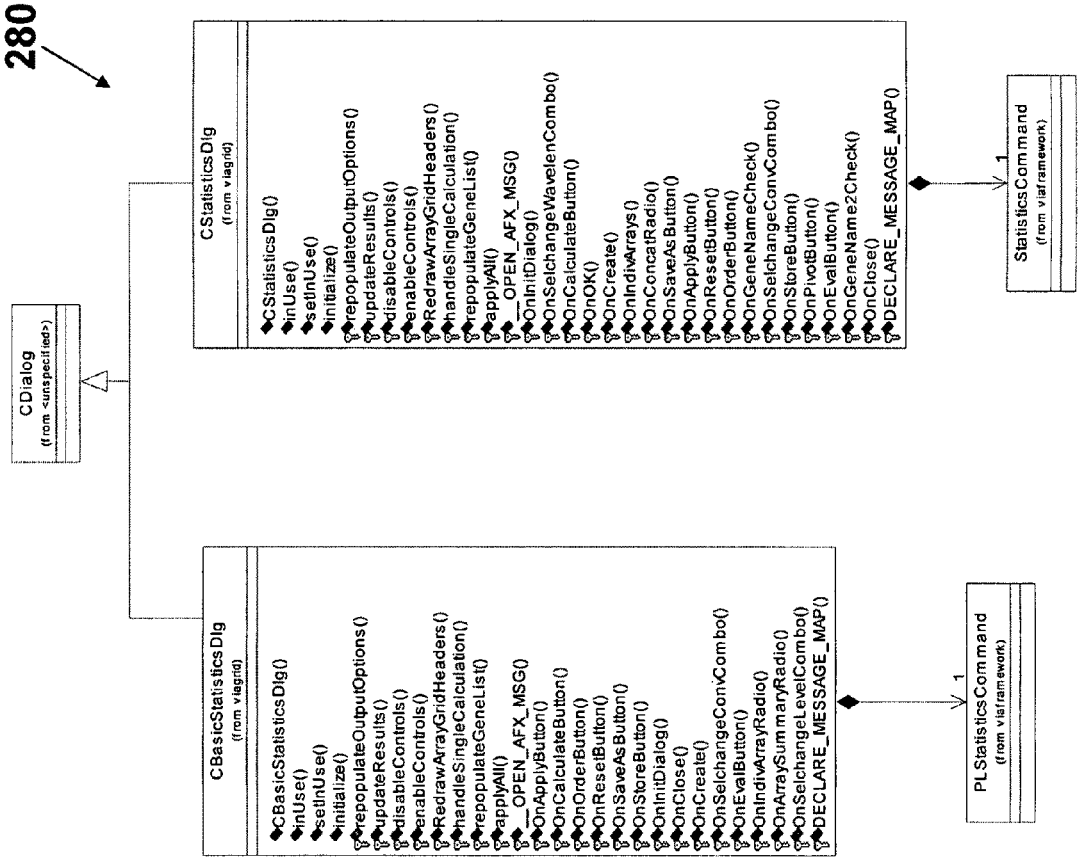
FIG. 27 illustrates a statistics dialog box/command containment hierarchy of the policy engine.

FIG. 27 illustrates a statistics dialog box/command containment hierarchy 280 of the policy engine that has two GUI-dialog classes that both inherit directly from CDialog. Each class contains a command of the appropriate type.

Figure 28:
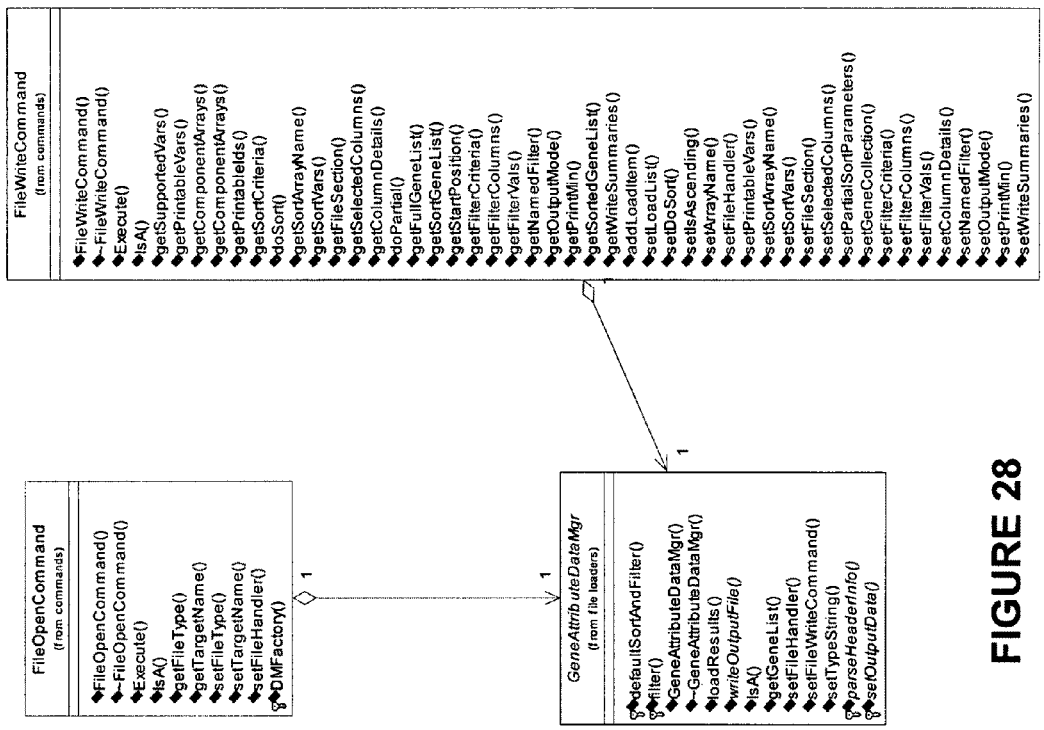
FIG. 28 illustrates a file load/write commands and data managers of the policy engine.
Figure 29:
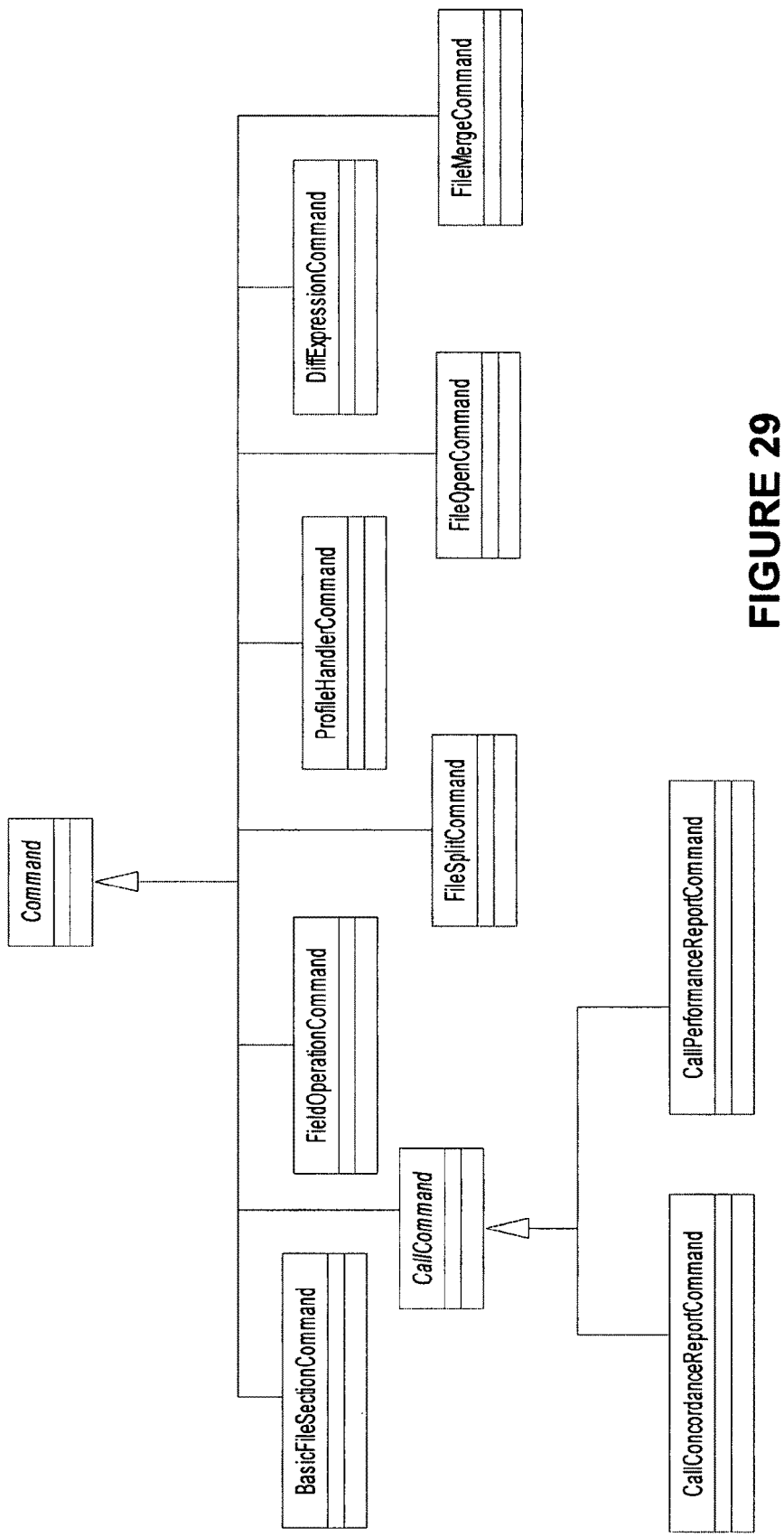
FIG. 29 illustrates a first command class of the policy engine.
Figure 30:
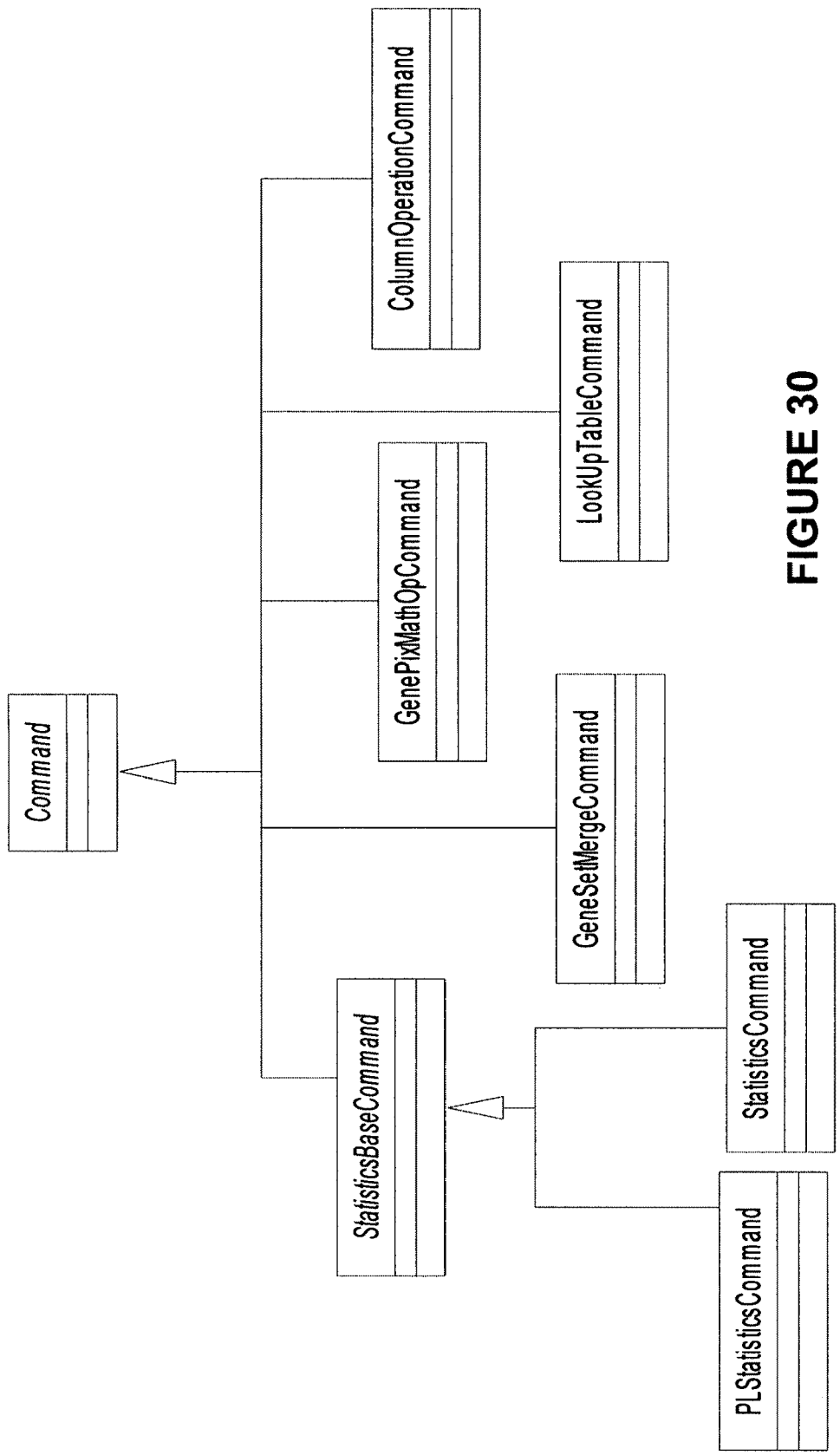
FIG. 30 illustrates a second command class of the policy engine.
Figure 31:
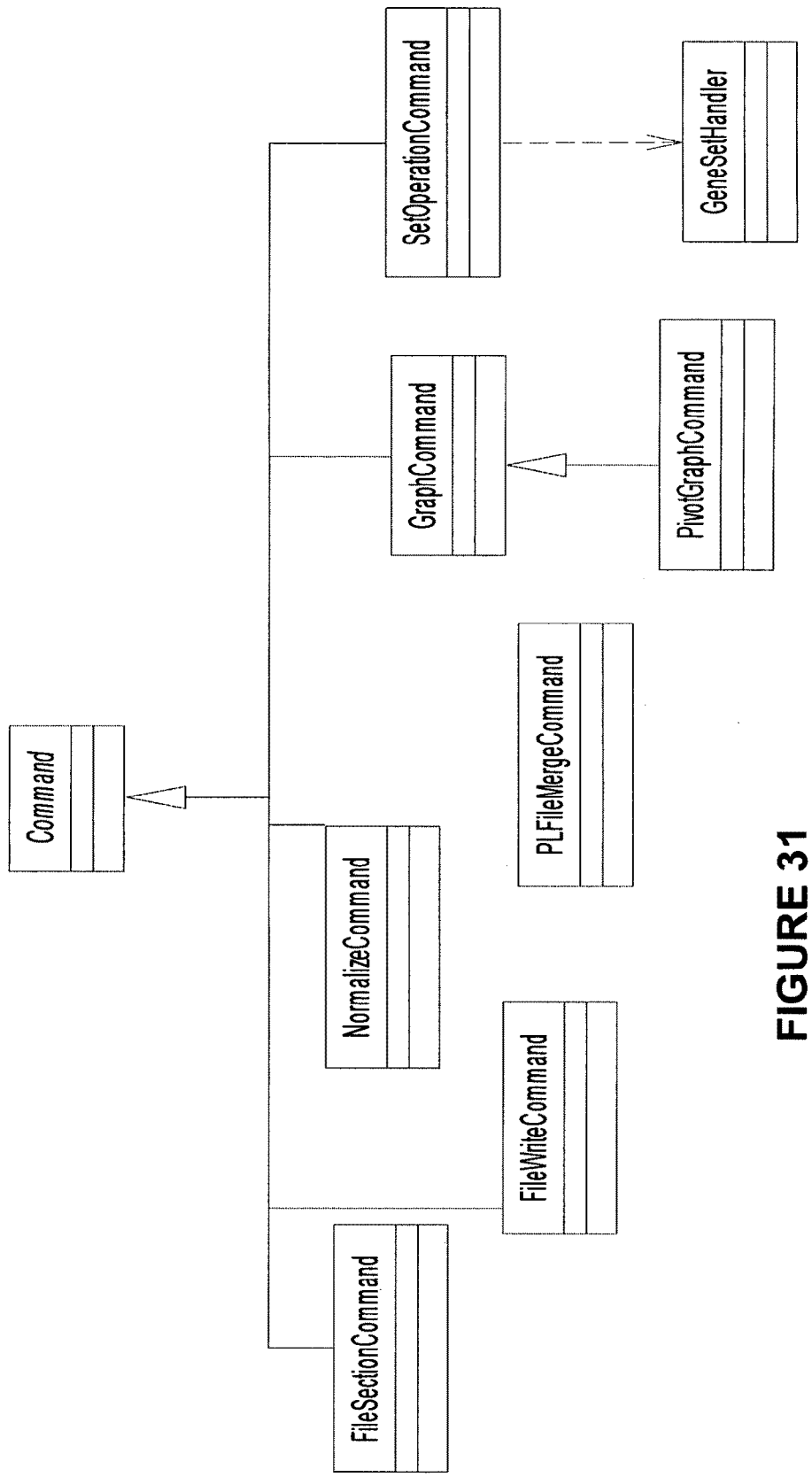
FIG. 31 illustrates a third command class of the policy engine.

The Command Pattern as related to file loading and writing are now described in more detail. The DataManager (DM) classes act as helper classes to the FileWrite and FileOpen command classes and are also encapsulated by these commands as shown in FIG. 28. FIGS. 29-31 show the other commands classes of the system wherein there is a command class corresponding to every significant operation carried out by the policy engine.

Figure 32:
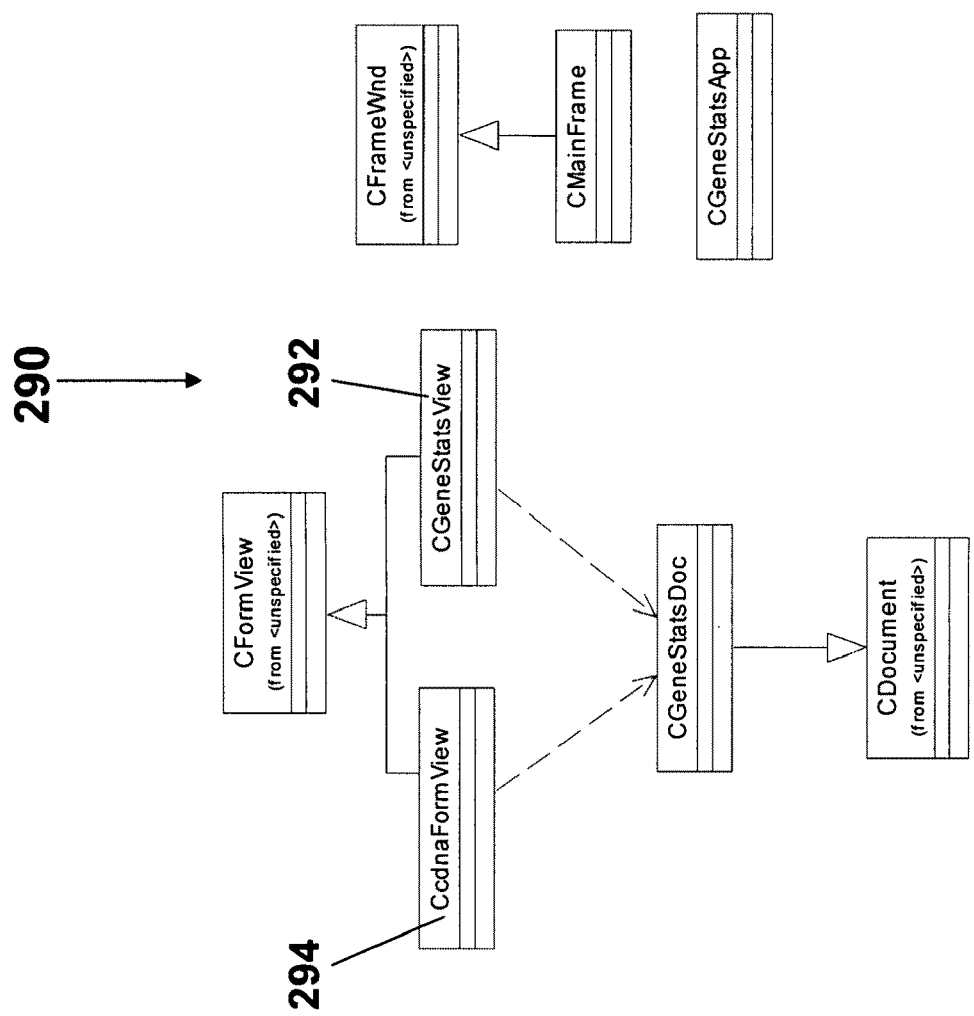
FIG. 32 illustrates a view class model of the policy engine.

FIG. 32 illustrates a view class model 290 of the policy engine. The policy engine is a single document interface (SDI) GUI project and this architecture imposes a document, view and mainframe class at the top level of the policy engine. In the policy engine, almost all of the real work is carried out by dialog boxes which are the next level down.

This leaves the top-level classes with only shell functionality. i.e. They provide the means to invoke the various dialog boxes but do very little else. The purpose of adopting this as a strategy is to allow the various policy engine dialog box based utilities to be easily invoked from applications other than the policy engine itself without any dependencies on these top-level classes.

Figure 33:
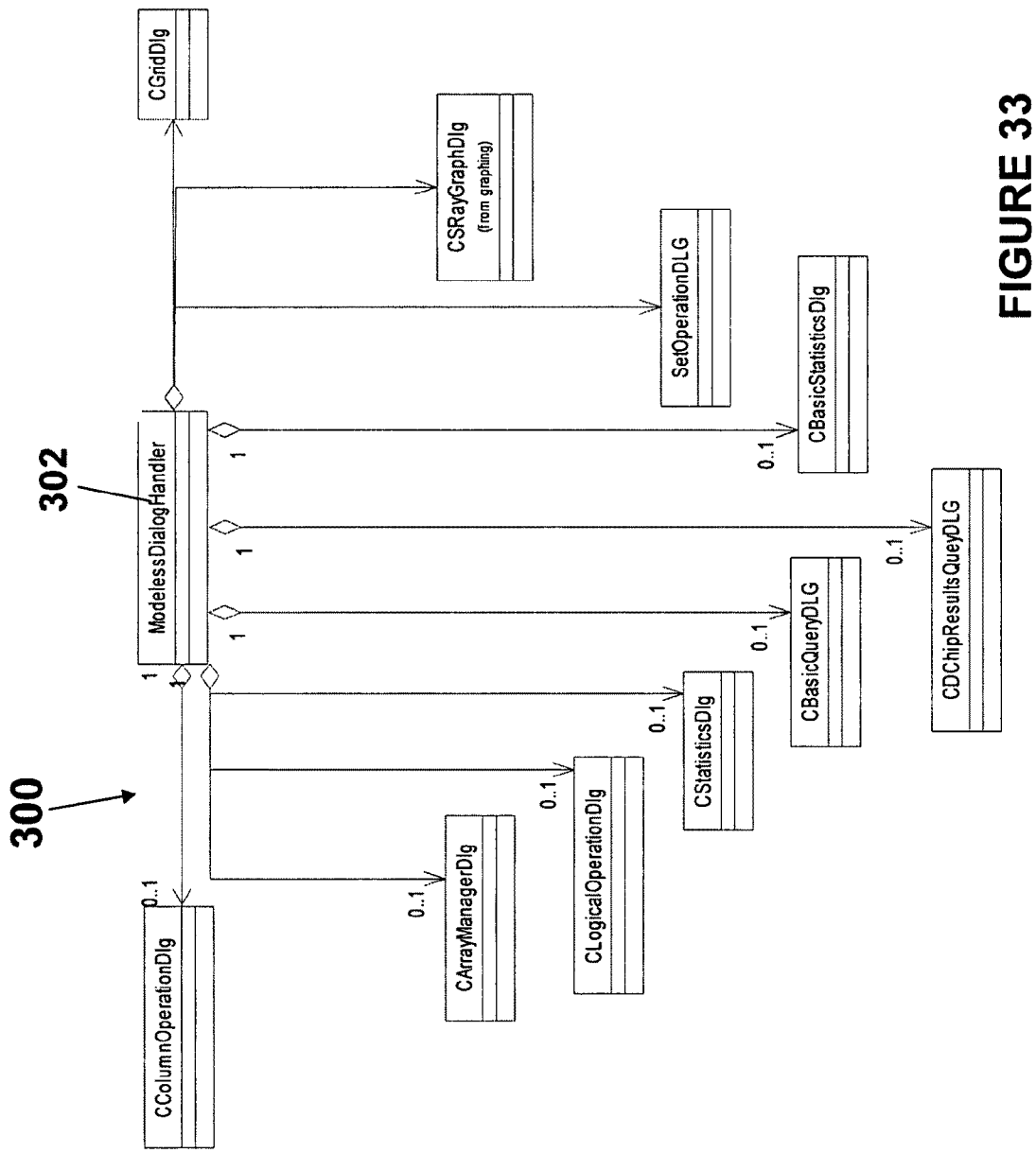
FIG. 33 illustrates a modeless dialog box class of the policy engine.

FIG. 33 illustrates a modeless dialog box class 300 of the policy engine. All Dialog boxes are derived from the GUI CDialog class (not shown in the diagram.) All of the dialog boxes that carry out complex tasks are modeless. Simple ones such as File Open remain modal. A ModelessDialogHandler 302 is a singleton class containing all of the modeless dialog box objects used by the policy engine. For most dialog boxes, provision is made for only a single instantiation within a given policy engine session with detached grid and graph dialog boxes being the exception since there may be multiple instantiations of these two dialog boxes. To invoke a modeless dialog box, the associated "Launch" method is invoked on the modeless dialog handler, which then checks to see the state of the requested dialog box wherein the states of the modeless dialog box can be "Not yet created", "hidden" or "already displayed."

For the multiple instance dialog boxes, the policy engine keeps a list of those that have already been used so that, when a request is received to invoke a dialog box of the same type, the Modeless Dialog Handler searches its list for one that is not in use. If it finds one, it displays it, if not then it creates a new one, displays it and adds it to its list. The modeless dialog boxes are not destroyed until the particular policy engine session is shut down.

Figure 34:
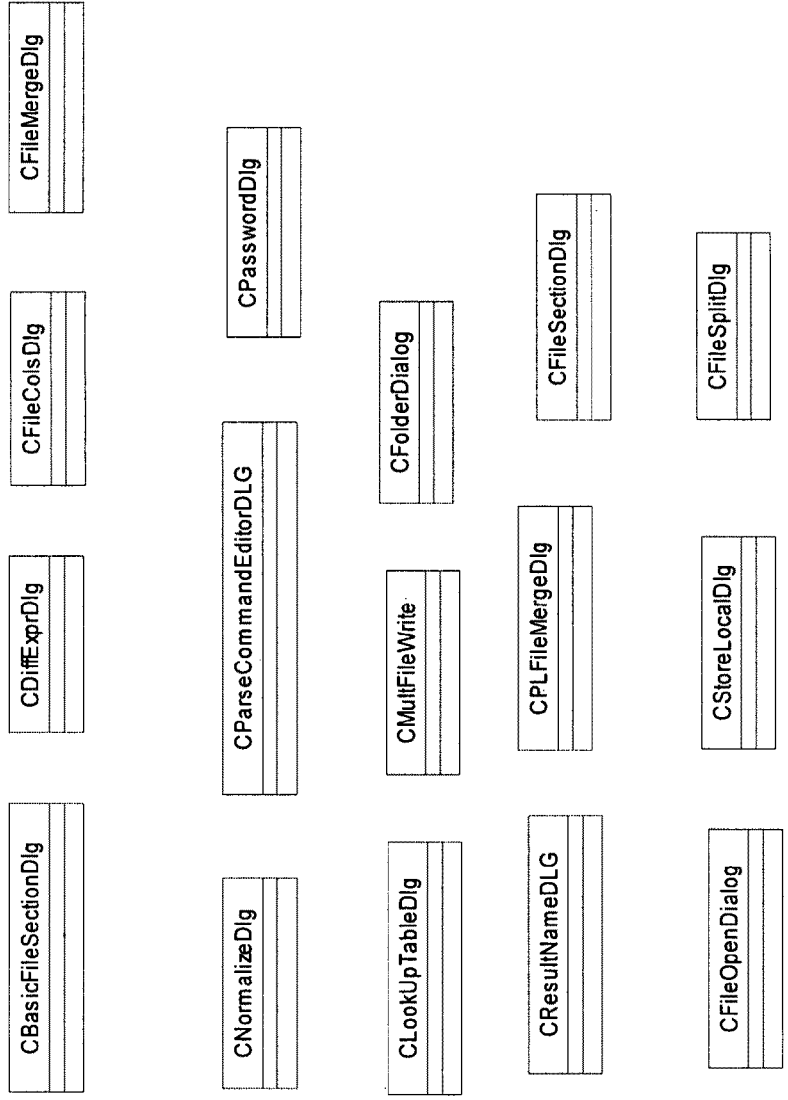
FIG. 34 illustrates a modal dialog box class of the policy engine.

FIG. 34 illustrates a modal dialog box classes 310 of the policy engine. For these modal dialog boxes, all dialog boxes inherit from the GUI CDialog class (not shown in the diagram.) All of the complex operations are now modeless while the operations shown in FIG. 34 are relatively simple and remain modal. These dialog boxes are typically invoked directly from the two "Views" classes.

Figure 35:
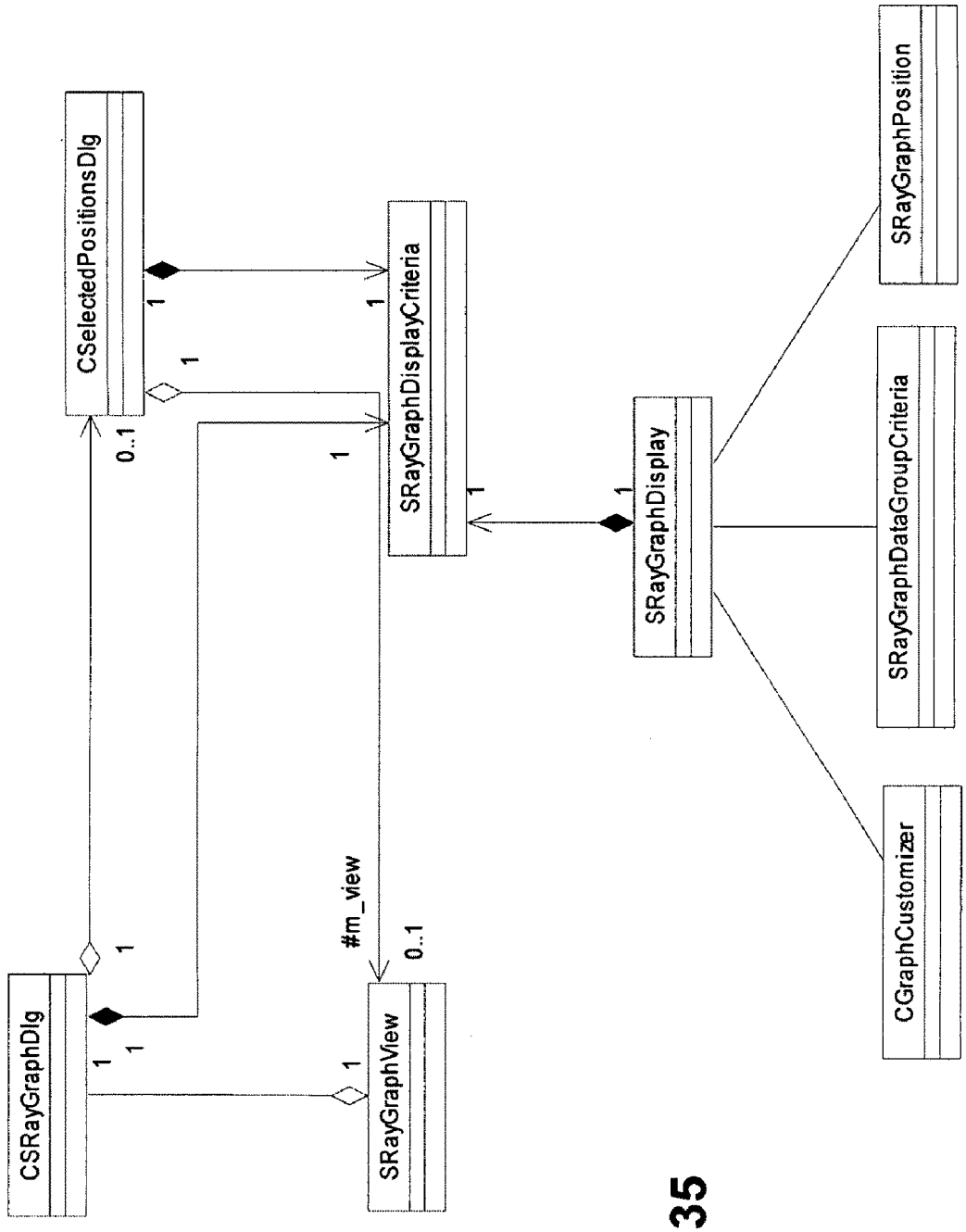
FIG. 35 illustrates a graphing module class of the policy engine.
Figure 36:
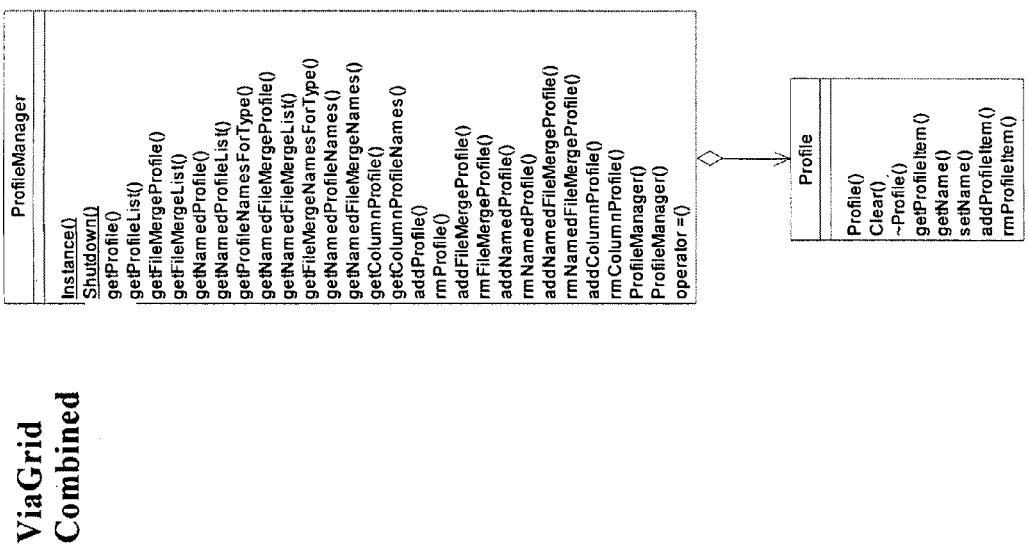
FIG. 36 illustrates a profile module class of the policy engine.
Figure 37:
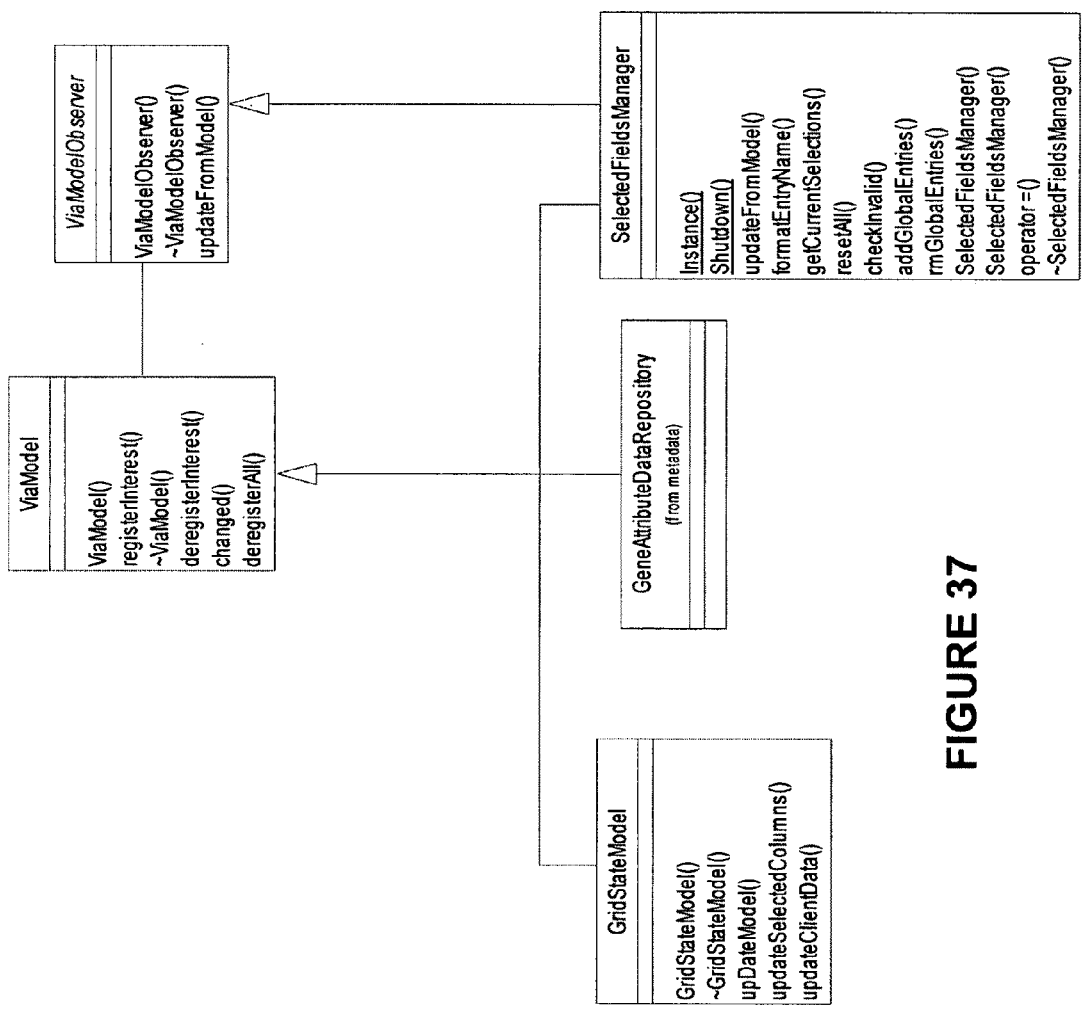
FIG. 37 illustrates an observer base class of the policy engine.

A graphing module class and a profile module class of the policy engine are shown in FIGS. 35-36 and FIG. 37 illustrates an observer base class of the policy engine.

The profile module is used to store file display and file merge profiles. These profiles are read from flat file at session start up and written back when the session ends. The metadata classes used for storing array and result file information is not appropriate to store profiles because they do not really support ordering. File display profiles specify the order in which the columns are to be displayed. ProfileManager is a singleton class and acts as the repository for the individual profile objects.

Figure 38A:
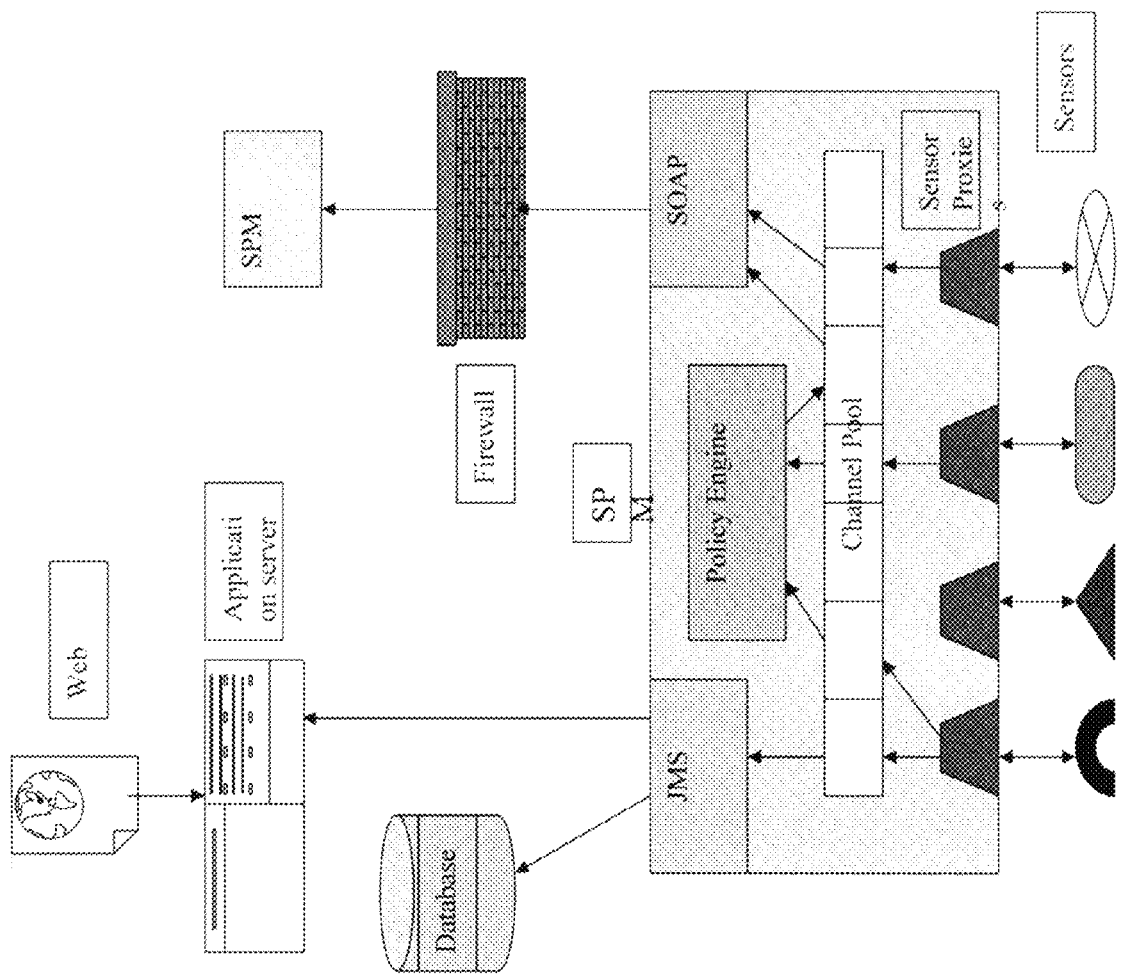
FIGS. 38A and 38B illustrate the SPM distributed architecture.
Figure 38B:
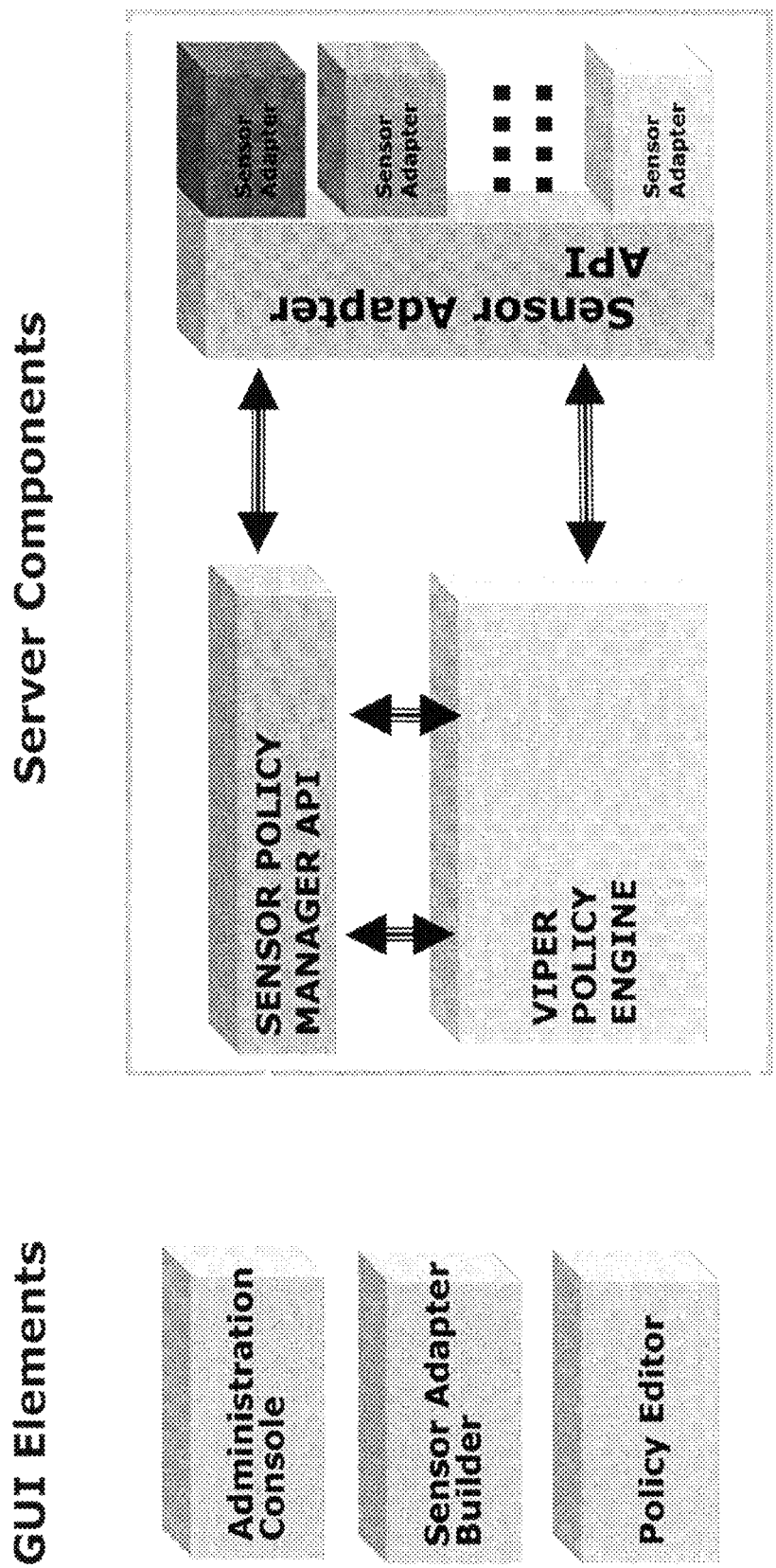

FIGS. 38A-40 illustrate more details of the Sensor Profile and Proxy manager of the system. In particular, FIGS. 38A and 38B illustrate the SPM distributed architecture. The Sensor Proxy Framework has been designed to allow the user to develop new sensor proxies very rapidly by establishing some standard patterns and hence allowing for a very high reuse of the existing code.

The Sensor Proxy Framework accomplishes the above by doing one or more of the following functions/operations:
- Each sensor proxy communicates with an individual sensor or mediator and normalizes the data received.
- Data is published via channels through JMS, SOAP or locally. JMS is a real time messaging hub that allows all components in SPM to send and receive real time messages. SOAP is used to navigate through a firewall or where a high performance is required.
- The SPM supports a completely distributed architecture. JMS and SOAP output channels can be inputs to other SPMs.
- The normalized format of all messages is standards-based. This format is SensorML for regular data and CAP1.1 for alerts and alarms.
- Each Sensor Proxy can publish four kinds of messages: namely data, alert, communications alarm and equipment alarm.
- The writer of a new sensor proxy is isolated from the details of this, including the underlying protocol supported by the channel. Any sensor proxy can be configured to have one or more of any of these channel types.
- The messages passed through each channel are configurable.
- These message types are configured so as to provide meaningful information about the underlying sensor.
- A special support is provided for sensors with many heads or for mediators where many different kinds of sensor are supported. Each of the heads has its own set of channels.
- Simple filters may also be configured for a sensor proxy so that only data satisfying certain criteria is forwarded on a channel.
- There is in-built support for a wide range of IP-based protocols in the sensor proxy framework. This means that the writer of a new sensor proxy is isolated from the underlying protocol and can concentrate on the customization required for the particular sensor proxy rather than the transport.
- Each sensor proxy also has the capability to receive commands from the policy engine or from other sensor proxies. These commands can be local (on-process) or remote (forwarded to another SPM over SOAP.)
- There are a set of tools built into the sensor proxy framework that assist the developer in writing a new sensor proxy. Examples are a token parser for binary protocols and a ric XML parser which converts an arbitrary XML document into a normalized format for use within the SPM.
- Each Sensor Proxy supports a simple simulation mode where the proxy forwards data based upon its internal configuration instead of establishing communications with a real sensor and sending live data.

Figure 39:
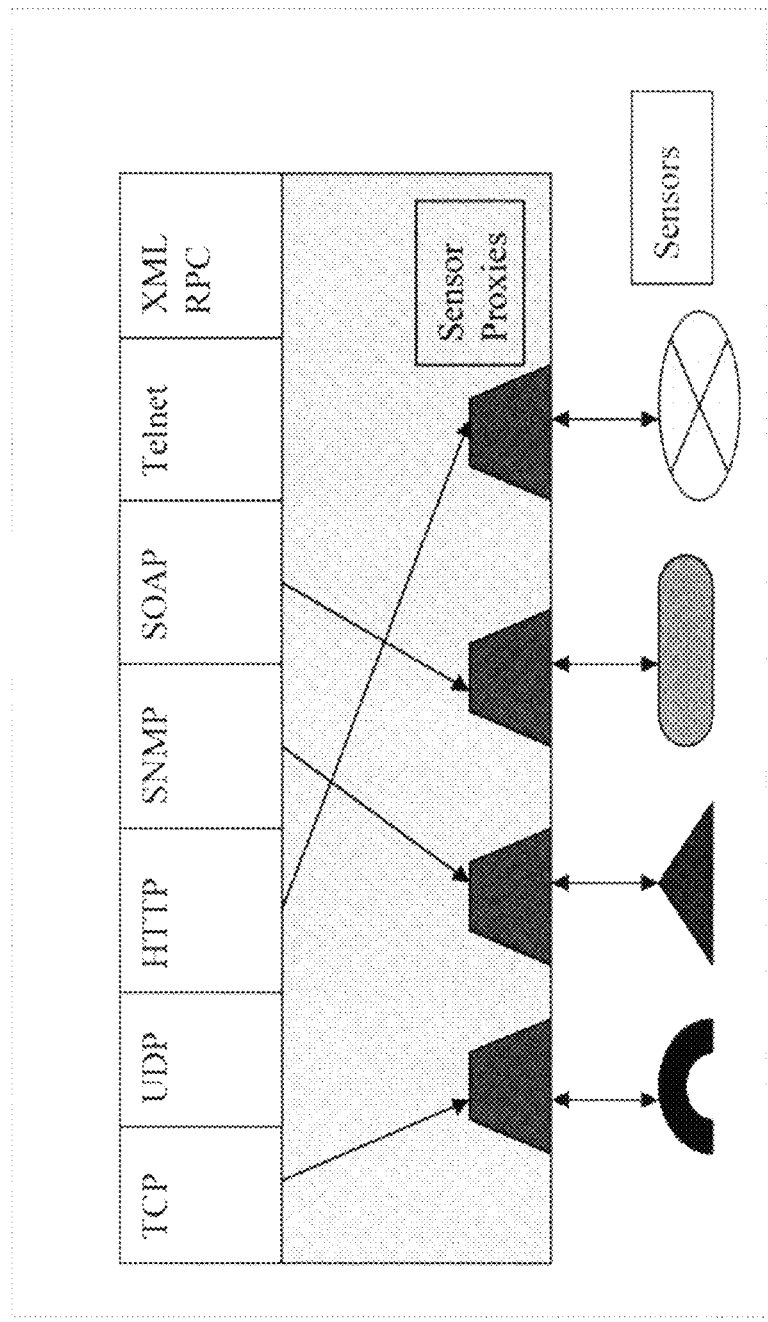
FIG. 39 illustrates the sensor proxy framework protocol support.

FIG. 39 illustrates the Sensor Proxy Framework and its protocol support. The sensor proxy framework provides base classes which support a wide range of protocols. The writer of a new sensor proxy derives from one of these classes, which effectively allows him to concentrate on the customizations that are required for the particular sensor. The workings of the underlying transport or application layer protocol is automatically taken care of by the framework. The protocols supported in the exemplary embodiment may include: TCP client and server, UDP, HTTP client and server, SOAP client and server, Telnet client, SNMP Manager and Agent, and/or XML-RPC.

Figure 40:
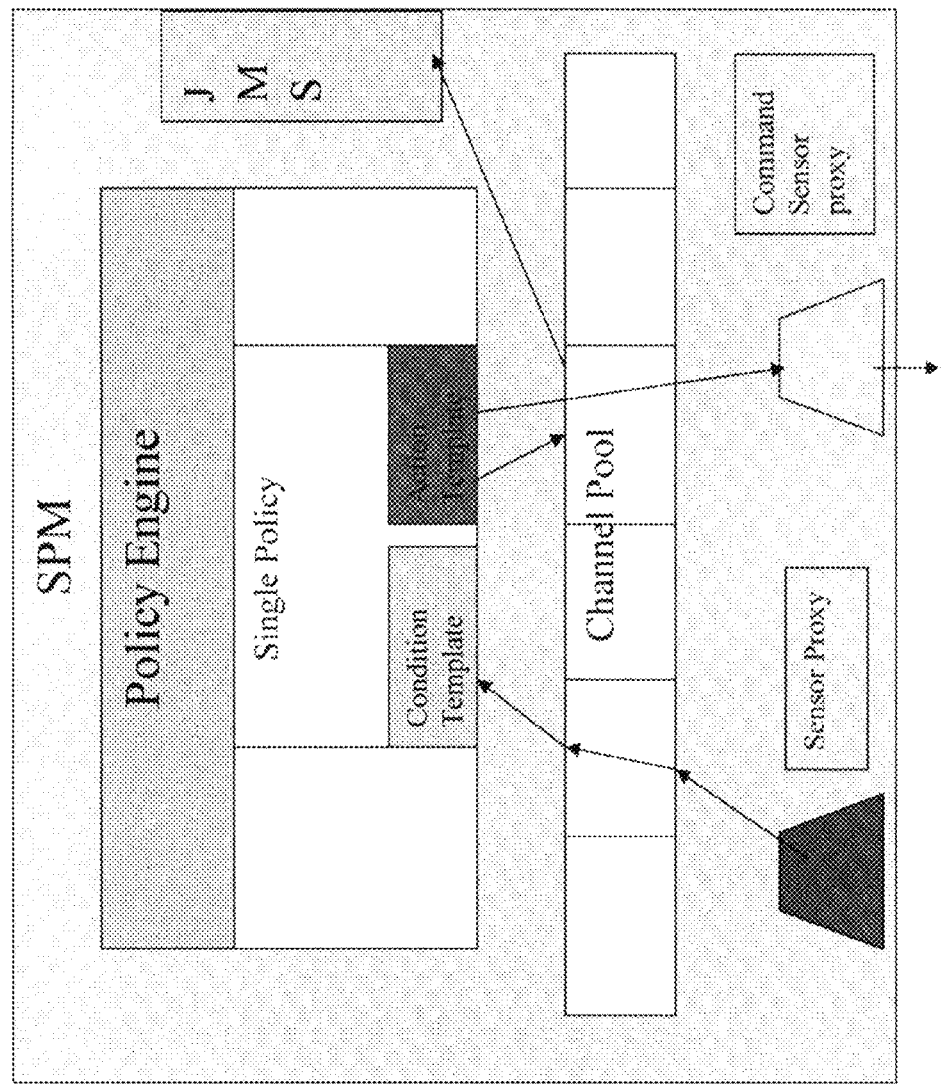
FIG. 40 illustrates more details of the policy engine.

FIG. 40 illustrates the policy engine of the system. The Policy Engine is a sophisticated Rules Engine which lies at the heart of the SPM. The Policy Engine contains a collection of individual policies and each policy contains a condition template and an action template. The input to a policy is a channel, usually an output channel from a sensor proxy, but it could also be a channel from another policy. A condition template is used to determine whether the policy should fire or not. At its most elementary, a condition template could provide a simple threshold. E.g. When the concentration of a gas monitored by sensor "A" exceeds threshold "X", the policy fires. However, even for a simple case like this, the condition template will often need to be more complex. For example, one might have a rule to prevent the policy from firing more than once per minute in order to avoid "Event Storms." This means that Conditions Templates also have the capability to evaluate some very complex rules.

When a policy fires (by the conditions being matched), the action template is executed. The Action Template consists of a sequence of actions. Examples of actions are:
- Transform the input message(s) to a derived message type and publish to JMS on an output channel (such as publishing an alert.)
- Issue a command to a command-type sensor proxy. (A specific example would result in a Text message appearing or a WEB page being displayed.)
- Play back the videos obtained for the past 30 seconds.
- Call a list of persons and deliver an audio message.
- Start video retrieval occurring and publish it on a channel.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A sensor interoperability system, comprising:
   one or more sensors that each generate a piece of sensor data;
   one or more sensor proxies, each sensor proxy coupled to one of the one or more sensors wherein each sensor proxy processes the piece of sensor data from the sensor to create a sensor system piece of data wherein the sensor system piece of data has a common format, wherein each sensor proxy sets parameters for the sensor associated with the sensor proxy using a set command, retrieves data from the sensor associated with the sensor proxy using a get command and publishes the sensor system piece of data using a publish command; and
   a policy unit coupled to the one or more sensor proxies over a communications path, wherein the policy unit further comprises one or more policies wherein each policy further comprises a condition and an action wherein the condition tests a sensor system piece of data and the action is an action that occurs when the condition is satisfied and a policy engine that applies the one or more policies to the sensor system piece of data.

2. The system of claim 1, wherein the one or more sensor proxies further comprises a first sensor proxy for a first type of sensor having a first set of characteristics and a second sensor proxy for a second type of sensor having a second set of characteristics.

3. The system of claim 1, wherein each sensor further comprises an information source.

4. The system of claim 3, wherein the one or more sensors further comprises one of a read-only sensor, a read-write sensor and a degenerative sensor.

5. The system of claim 4, wherein the one or more sensors further comprises one of a real time location system sensor, a building management system sensor, a distributed control system sensor, a supervisory control and data analysis (SCADA) system sensor, a biometric sensor, a chemical sensor, a biosensor, a nuclear sensor, a video sensor and a geographical information system sensor.

6. The system of claim 5, wherein the video sensor further comprises one of a low resolution visible spectrum sensor, a high resolution visible spectrum sensor and a thermal sensor.

7. The system of claim 5, wherein the geographical information system sensor further comprises a sensor that pulls data that is in CAD format and a sensor that pulls data from a geographical information system database.

8. The system of claim 1, wherein the policy unit further comprises a field programmable field gate array on which one or more pieces of software code are stored that implement the functions of the policy unit.

9. The system of claim 1, wherein the policy unit further comprises one or more pieces of software code wherein the one or more pieces of software code implement the functions of the policy unit.

10. The system of claim 1, wherein the common format further comprises a SensorML format.

11. A method for monitoring a system using a sensor network, comprising:
   generating a piece of sensor data at each of one or more sensors;
   processing, using a processor-based sensor proxy, each piece of sensor data of each sensor to create a sensor system piece of data wherein the sensor system piece of data has a common format, wherein each sensor proxy sets parameters for the sensor associated with the sensor proxy using a set command, retrieves data from the sensor associated with the sensor proxy using a get command and publishes the sensor system piece of data using a publish command;
   determining, using a processor-based policy engine, if the sensor piece of data triggers a policy contained in the policy engine wherein the policy is triggered when the sensor system piece of data meets a condition of one or more policies stored in the policy engine; and
   performing, using the processor-based policy engine, an action of the triggered policy.

12. The method of claim 11, wherein the processing of each piece of sensor data further comprises processing a piece of sensor data from a first type of sensor having a first set of characteristics into the common format and processing a piece of sensor data from a second type of sensor having a different set of characteristics into the common format.

13. The method of claim 11, wherein generating the piece of sensor data further comprises generating a piece of data from an information source.

14. The method of claim 13, wherein generating the piece of sensor data further comprises generating a piece of data from one of a read-only sensor, a read-write sensor and a degenerative sensor.

15. The method of claim 14, generating the piece of sensor data further comprises generating a piece of data from one of a real time location system sensor, a building management system sensor, a distributed control system sensor, a supervisory control and data analysis (SCADA) system sensor, a biometric sensor, a chemical sensor, a biosensor, a nuclear sensor, a video sensor and a geographical information system sensor.

16. The method of claim 11, wherein the common format further comprises a SensorML format.

* * * * *